US008335922B2

(12) United States Patent
Yoshioka et al.

(10) Patent No.: US 8,335,922 B2
(45) Date of Patent: Dec. 18, 2012

(54) RECORDING MEDIUM, DIGITAL INFORMATION VERIFICATION APPARATUS, AND DIGITAL INFORMATION VERIFICATION METHOD

(75) Inventors: Takashi Yoshioka, Kawasaki (JP); Masahiko Takenaka, Kawasaki (JP); Tetsuya Izu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1217 days.

(21) Appl. No.: 11/882,097

(22) Filed: Jul. 30, 2007

(65) Prior Publication Data
US 2008/0082829 A1 Apr. 3, 2008

(30) Foreign Application Priority Data

Sep. 29, 2006 (JP) ................................. 2006-267772

(51) Int. Cl.
*G06F 21/00* (2006.01)
(52) U.S. Cl. ........................................ 713/176; 713/193
(58) Field of Classification Search .................. 713/176
See application file for complete search history.

(56) References Cited

U.S. PATENT DOCUMENTS

2007/0226504 A1* 9/2007 de la Iglesia et al. .......... 713/176

FOREIGN PATENT DOCUMENTS

| JP | 2000-285024 | 10/2000 |
|---|---|---|
| JP | 2001-117820 | 4/2001 |
| JP | 2003-114884 | 4/2003 |

OTHER PUBLICATIONS

Miyazaki, K. et al., "Digital Document Sanitizing Problem," Paper of Information Processing Society of Japan/Computer Security Group (CSEC), pp. 61-67, Jul. 17, 2003.
Miyazaki, K. et al., "A Digital Document Sanitizing Scheme with Disclosure Condition Control," Proceedings of the 2004 Symposium on Cryptography and Information Security, vol. I, pp. 515-520, Sendai, Japan, Jan. 27-30, 2004.
Yoshioka, T. et al., "Proposal on Partial Integrity Assurance Technology that Considers Correction and Distribution for Electronic Documents," pp. 231-232.

* cited by examiner

Primary Examiner — Gilberto Barron, Jr.
Assistant Examiner — Simon Kanaan
(74) Attorney, Agent, or Firm — Staas & Halsey LLP

(57) ABSTRACT

Certification/verification of authenticity and integrity of a digital document can be achieved, using meta information and content information and third-party certification thereof is achieved.
A digital information verification program stored in a recording medium according to the present invention allows a computer to determine presence/absence of any change made to the digital information and identify the changed part by the following steps: generating the feature amount information with respect to the digital information to be verified and registering it in association with the digital document; in the case where any operation is made to the digital information, acquiring the feature amount information (meta information related parameters and content information related parameters) of the meta information and content information concerning the operation, the feature amount information including the same items (meta information and content information) as those of the feature amount information related to the digital information before being operated; and comparing the feature amount information before and after the operation.

20 Claims, 22 Drawing Sheets

FIG. 7

FEATURE AMOUNT INFORMATION

FEATURE AMOUNT OF META INFORMATION

| EXTRACTED ITEM | ITEM NAME | GENERATION METHOD |
|---|---|---|
| [3] | TOTAL NUMBER OF PAGES | AS IT IS |
| [1, 2, 3] | PAGE ORDER | AS IT IS |
| [0, 0, 0] | ROTATION ANGLE | AS IT IS |

FEATURE AMOUNT OF CONTENT INFORMATION

| EXTRACTED ITEM | ITEM NAME | GENERATION METHOD |
|---|---|---|
| [abc123] | 1ST PAGE | Hash |
| [def456] | 2ND PAGE | Hash |
| [ghi789] | 3RD PAGE | Hash |

FIG. 8

| MANAGEMENT CARD | |
|---|---|
| DIGITAL INFORMATION ID | 8919201 |
| MANAGEMENT TIME | AUGUST 1, 2006 17:34:10 |
| VERSION NUMBER | 1.0 |
| CREATOR | DIGITIZED OPERATOR |
| SUBJECT MATTER | SCANNED DOCUMENT |
| SIGNER | DIGITIZED OPERATOR |

FIG. 9

FIG. 14

FEATURE AMOUNT INFORMATION

FEATURE AMOUNT OF META INFORMATION

| EXTRACTED ITEM | ITEM NAME | GENERATION METHOD |
|---|---|---|
| [3] | TOTAL NUMBER OF PAGES | AS IT IS |
| [1, 2, 3] | PAGE ORDER | AS IT IS |
| [0, Right90, 0] | ROTATION ANGLE | AS IT IS |

FEATURE AMOUNT OF CONTENT INFORMATION

| EXTRACTED ITEM | ITEM NAME | GENERATION METHOD |
|---|---|---|
| [abc123] | 1ST PAGE | Hash |
| [def456] | 2ND PAGE | Hash |
| [ghi789] | 3RD PAGE | Hash |

FIG. 15

| MANAGEMENT CARD | |
|---|---|
| DIGITAL INFORMATION ID | 8919201 |
| MANAGEMENT TIME | AUGUST 10, 2006 13:32:45 |
| VERSION NUMBER | 2.0 |
| CREATOR | OPERATOR IN CHARGE OF MAKING CHANGE |
| SUBJECT MATTER | SCANNED DOCUMENT (ROTATION ERROR HAS BEEN CORRECTED) |
| SIGNER | OPERATOR IN CHARGE OF MAKING CHANGE |

FIG. 16

| DIGITAL INFORMATION | ID: 8919201 |

VERSION NUMBER : 1.0

DIGITAL INFORMATION (1ST VERSION)

FEATURE AMOUNT INFORMATION (1ST VERSION)

FEATURE AMOUNT OF META INFORMATION

| EXTRACTED ITEM | ITEM NAME | GENERATION METHOD |
|---|---|---|
| [3] | TOTAL NUMBER OF PAGES | AS IT IS |
| [1, 2, 3] | PAGE ORDER | AS IT IS |
| [0, 0, 0] | ROTATION ANGLE | AS IT IS |

FEATURE AMOUNT OF CONTENT INFORMATION

| EXTRACTED ITEM | ITEM NAME | GENERATION METHOD |
|---|---|---|
| [ abc123] | 1ST PAGE | Hash |
| [ def456] | 2ND PAGE | Hash |
| [ ghi789] | 3RD PAGE | Hash |

300-1  200-1  DIGITAL SIGNATURE 300-1  200-1  DIGITAL SIGNATURE

VERSION NUMBER : 2.0

DIGITAL INFORMATION (2ND VERSION)

FEATURE AMOUNT INFORMATION (2ND VERSION)

FEATURE AMOUNT OF META INFORMATION

| EXTRACTED ITEM | ITEM NAME | GENERATION METHOD |
|---|---|---|
| [3] | TOTAL NUMBER OF PAGES | AS IT IS |
| [1, 2, 3] | PAGE ORDER | AS IT IS |
| [0, Right90, 0] | ROTATION ANGLE | AS IT IS |

FEATURE AMOUNT OF CONTENT INFORMATION

| EXTRACTED ITEM | ITEM NAME | GENERATION METHOD |
|---|---|---|
| [ abc123] | 1ST PAGE | Hash |
| [ def456] | 2ND PAGE | Hash |
| [ ghi789] | 3RD PAGE | Hash |

300-2  200-2  DIGITAL SIGNATURE 300-2  200-2  DIGITAL SIGNATURE

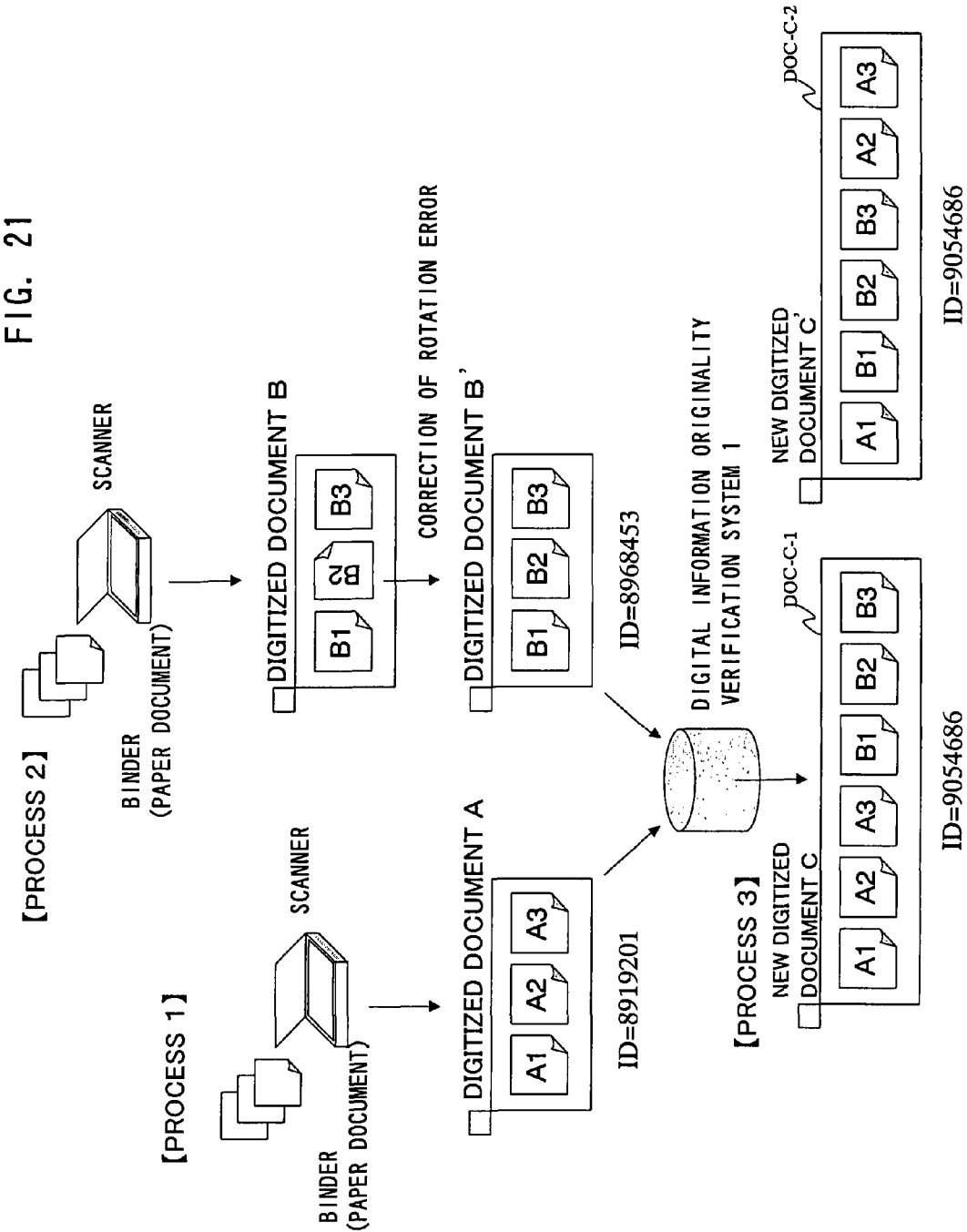

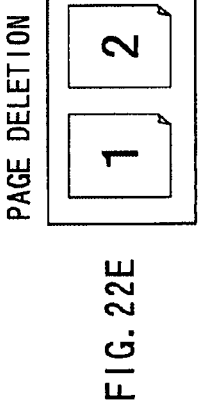
FIG. 22A CHANGE OF FILE FORMAT
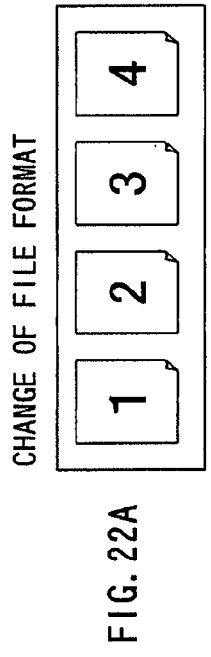
FIG. 22B PAGE ORDER CHANGE
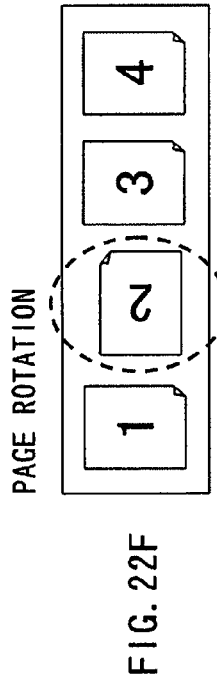
FIG. 22C PAGE INSERTION
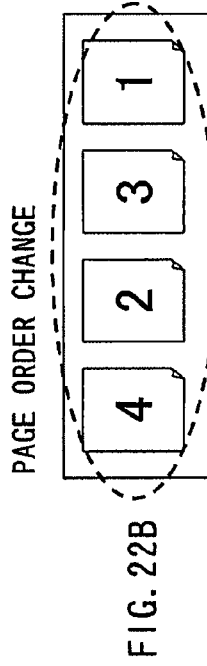
FIG. 22D JPEG ALTERATION TO PAGE
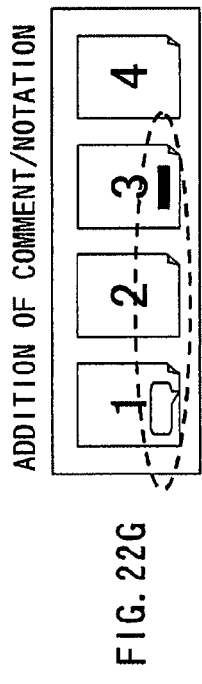
FIG. 22E PAGE DELETION
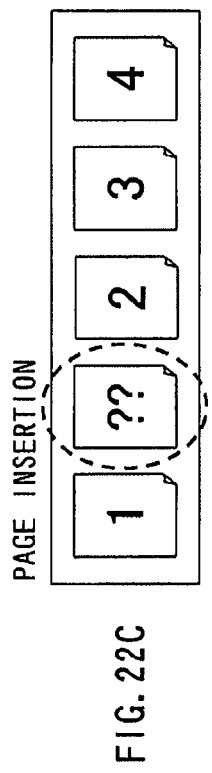
FIG. 22F PAGE ROTATION
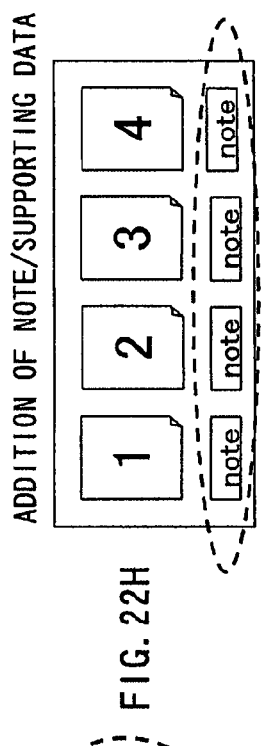
FIG. 22G ADDITION OF COMMENT/NOTATION
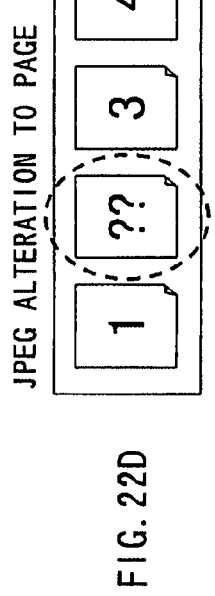
FIG. 22H ADDITION OF NOTE/SUPPORTING DATA

RECORDING MEDIUM, DIGITAL INFORMATION VERIFICATION APPARATUS, AND DIGITAL INFORMATION VERIFICATION METHOD

BACKGROUND OF THE INVENTION

1. Field of the Invention

The present invention relates to a recording medium, a digital information verification apparatus, and a digital information verification system that identify a digital document based on feature amount information generated using meta information such as a header or property and content information which is document content to thereby support validation or verification of authenticity and integrity of a digital document and enable third-party certification thereof.

2. Description of the Related Art

Along with the recent advancement of information technology (IT), documents such as an administrative document, accounting book of private companies, and contract document that have been stored and managed in the form of a paper are now gradually digitized.

More specifically, a use of a scanner allows documents that have been stored in the form of a paper to be easily digitized. Further, practical application of a high-resolution image scanner makes digital archive of a large number of paper documents, which has not been unauthorized, legally acceptable, if a given security requirement is satisfied (e-document law, which came into effect on April. 2005).

Along with increasing demand for digital archive of such documents, the need of a technique for safely storing and managing a digital document is increased. It is said that it is necessary to satisfy technical requirements such as "falsification detection/prevention", "identification of a creator", "access management/control" and "historical management" in order to digitally store a document, which has been stored in the form of a paper, with evidence admissibility of the paper document maintained. A conventional document management system is not enough for satisfying such requirements. Thus, in recent years, development and launching of "originality assurance system" is accelerated.

As the most widely used technique in this "originality assurance system", there is known a digital signature and time stamp. The digital signature is a technique capable of identifying the creator of a document (validating identity) as well as obtaining third party certification that no modification has been made to the document (validating integrity). The time stamp can certify the time at which a document is newly created in addition to the above function of the digital signature. The digital signature and time stamp are added to the entire document.

A conventional concept of the originality assurance system realized by using the techniques described above is to safely manage a document of the fixed final version as an original document, that is, to store so-called "paper" document in a locked document stack. In short, the system targets a document the location of its original document of which is clear. Under such an environment, the digital signature and time stamp are used as very effective techniques for assuring identity or integrity.

As prior arts relating to the present invention, the following technique 1) is known. Further, techniques 2) and 3) which have been obtained by further developing the technique 1) are known.

1) Digital Document Originality Assurance Technique

As a technique for assuring the originality of a digital document, Jpn. Pat. Appln. Laid-Open Publication No. 2000-285024 and Jpn. Pat. Appln. Laid-Open Publication No. 2001-117820 are known.

2) Digital Document Sanitizing Technique

A solution for a digital document sanitizing problem is proposed in Paper of Information Processing Society of Japan/Computer Security Group (CSEC) "Digital document sanitizing problem (2003/7/17) (2003-CSEC-22-009)". In this technique, a digital document is divided into blocks, and partial signatures (hash values) for respective blocks are generated. The generated hash values are embedded in non-disclosure parts of the document body, allowing the parts having the same hash value to be detected as unchanged parts and the parts having different hash values to be detected as a change. Further, Paper "A Digital Document Sanitizing Scheme with Disclosure Condition Control" (2004, Symposium on Cryptography and Information Security (SCIS2004)) has proposed a digital document sanitizing technique capable of controlling whether or not to make additional sanitizing for a disclosure part.

3) Digital Document Partial Integrity Assurance Technology

Techniques for directly making partial operations for a digital document, such as addition, correction, sanitizing, and distributing the changed part have been proposed in Paper of 3rd Forum of Information Technology (FIT2004) "Partial integrity assurance scheme in consideration of correction/distribution of digital document" (M-066), Computer Security Group (CSEC), and Symposium on Cryptography and Information Security (SCIS). In this technique, the hash value for each part in a digital document is stored as identification information, and a corrected part and its identification information after correction are stored every time a correction has been made to the document. Then, by submitting the current document/its corrected parts and identification information of the current and previous versions, verification of the document can be made in the location where the document is submitted. This technique enables tracking of a history indicating when, how, who has made a change to which part in the document, in addition to identification of a changed part and certification of unchanged part.

However, the technique like the above 1) that adopts a typical digital signature/time stamp takes no consideration of originality assurance in a document, such as an application form or approval document, which is distributed from place to place with partial operations such as addition, correction, sanitizing made directly thereto. Consequently, by its tamper-proof nature, this technique impedes handling of such a document.

Problems in the conventional digital signature scheme that is featured in that a digital signature is added to the entire document will be described below.

A description will be made focusing a single/multiple documents and a filing or document constituted by a single/multiple pages (hereinafter, referred collectively as "binder"). In the conventional digital signature scheme, a digital signature is often added to the entire binder. In this case, although it is possible to detect whether any change has been made to the entire binder, it is impossible to detect which document (page) in the binder the change has been made to.

As a countermeasure against the above, a method that adds a digital signature in units of a document (page) in the binder and, at the same time, adds it also to the binder has been proposed. According to this method, it is possible to identify the document (page) to which a change has been made and detect that the remaining documents (pages) are unchanged.

In this method, however, it is impossible to certify that the unchanged documents have existed together with the changed document from the time point at which the entire binder is newly created. That is, if only a part of the document has been changed, reliability regarding the authenticity and integrity becomes lowered.

Further, in the case where a threat that a given document (page) in the binder is replaced by another one with a digital signature or, more concretely, and a threat that a given document (page) in the binder is replaced by a given document (page) of another binder occurs, it is not impossible to detect/certify the above fact based on a digital signature that has been added to the entire binder. That is, it is impossible to certify the order in which the documents (pages) in the binder are created and authenticity/integrity of the respective documents (pages) at the time point of creation, at the same time.

The above technique of 1) does not describe the above points and only aims to use a digital signature to simply store a digital document in a complete state (a state where no change has been made).

In order to solve the problem related to the technique 1), techniques as 2) and 3) are now widely spreading. That is, according to these techniques, if a part of the document is changed, certification that the remaining part is unchanged can be achieved.

However, there is the following disadvantage even in the techniques 2) and 3). Here, as a concrete example, unstructured document type, such as PDF (Portable Document Format) or Microsoft Office Word is considered. Such a format is roughly constituted by "Content information" representing the content itself of a document and "meta information" representing the header or property (version information, total number of pages, order of pages, angle of rotation of each page, notation, magnification, etc.) of the document. The conventional techniques 2) and 3) treat "content information+meta information" as one document and focus on the content of the content information.

For example, assume that content information constituted by "name", "address", and "telephone number" exists and that operation of hiding (sanitizing) "name" is performed at the time of disclosure. In this case, only certification that "address" and "telephone number" have not been changed has been made, while operation such as page rotation or addition of notation is out of consideration. That is, meta information such as the rotation angle of documents (pages) in the binder, notation, or the like is entirely out of consideration.

The above problems are summarized as follows in view of actual operation and actual use form.

It is assumed that a binder (paper document) is captured by a scanner to obtain a digital document (e.g., PDF format), and the digital document is stored with a digital signature and time stamp added thereto.

In an operating process of generating a digitized document from a paper document in the existing e-document law, a digitization operator (operator who performs scan operation) and digitization manager (manager who performs final review and approval) are typically specified.

The digitization operator first performs scan operation and verifies sameness between a digitized document and original paper document and, then, adds his or her digital signature to the digitized document. In the case where the number of binders (papers) reaches several tens of thousands of documents (pages), the binders are set in an auto document feeder provided in a scanner for automatic scan processing, and the verification of sameness between the digitized document and paper original document is often omitted in terms of operating effectiveness.

Thus, the digital signature of the digitization operator is added to the digital document without verification of the sameness and, then, approval processing is forwarded to the digitization manager. Whatever the case may be, verification of the sameness between the digitized document and original paper document needs to be performed in the subsequent time point. In this case, the digitization manager who gives final approval may perform the verification, or there may be a case where another operator who is in charge of the verification thereof may be designated.

If a given document (page) is inclined in an unintended direction (angle) as a result of the digitization process, viewability of the obtained document may be impaired. However, in the case where the above error related to the direction of the document (page) is corrected or must be corrected, the digitization operating process is started once again from the scan operation. This lowers operating effectiveness.

As a result, correction is inevitably made to the digitized document. However, the digital signature of the digitized operator has already been added to the digitized document. Accordingly, if the rotation error is corrected at this time point, the applied correction is determined to be a kind of a changing action according to the nature of the digital signature technique. Thus, the conventional technique cannot respond to such a situation sufficiently.

If a given document (page) is rotated by any angle, the content information itself is not changed from its original document. Therefore, the sameness between the digitized document and original paper document must be electrically certified. That is, it is necessary to verify/certify that no change has been made to the digitized document from the time when the document is newly created.

Similarly, even in the case where a comment such as a search keyword, notation, or the like, a note, or supporting data is added in each document (page) with respect to digitized document with a digital signature/time stamp that has been finally approved by the digitization manger or where a change of the order of documents (pages), partial insertion/deletion, change of the content, or the like is made, it is necessary to detect the above operations and validate/verify the authenticity and integrity of documents (pages) in the binder.

SUMMARY OF THE INVENTION

The present invention has been made to solve the above problems, and an object thereof is to provide a recording medium, digital information verification apparatus, and a digital information verification method capable of: certifying/verifying authenticity and integrity of a digital document including meta information such as a header, property, and the like and content information by using the meta information and content information; achieving third-party certification of the digital document; and responding flexibly to operations such as page rotation, notation addition, and the like even after, e.g., scan operation (addition of digital signature/time stamp).

To solve the above problems, according to a first aspect of the present invention, there is provided a recording medium that records a computer-readable digital information verification program in order to allows a computer to execute a method of verifying digital information, the digital information verification program allows a computer to execute: a feature amount information generation step that uses meta information and content information of the digital information to generate feature amount information for identifying the digital information; a registration step that registers the feature amount information generated by the feature amount information generation step and digital information in association with each other; and a feature amount information verification step that uses the feature amount information generation step to generate feature amount information of another digital information corresponding to the digital information registered by the registration step, uses the generated feature amount information and the feature amount information registered by the registration step to determine presence/absence of any change made to the digital information registered by the registration step and, when determining that any change has been made, identifies the changed part to verify the digital information.

According to a second aspect of the present invention, there is provided a digital information verification apparatus that verifies digital information, comprising: a feature amount information generation section that uses meta information and content information of the digital information to generate feature amount information for identifying the digital information; a registration section that registers the digital information and the feature amount information generated from the digital information in association with each other; and a feature amount information verification section that uses the feature amount information generation section to generate feature amount information of another digital information corresponding to the digital information registered by the registration section, uses the generated feature amount information and the feature amount information registered by the registration section to determine presence/absence of any change made to the digital information registered by the registration section and, when determining that any change has been made, identifies the changed part to verify the digital information.

According to a third aspect of the present invention, there is provided a digital information verification method allowing a computer to execute verification of digital information, comprising: a feature amount information generation step that uses meta information and content information of the digital information to generate feature amount information for identifying the digital information; a registration step that registers the feature amount information generated by the feature amount information generation step and digital information in association with each other; and a feature amount information verification step that uses the feature amount information generation step to generate feature amount information of another digital information corresponding to the digital information registered by the registration step, uses the generated feature amount information and the feature amount information registered by the registration step to determine presence/absence of any change made to the digital information registered by the registration step and, when determining that any change has been made, identifies the changed part to verify the digital information.

As described above, according to the present invention, it is possible to certify/verify authenticity and integrity of a digital document including meta information such as a header, property, and the like and content information by using the meta information and content information, to achieve third-party certification of the digital document and to respond flexibly to operations such as page rotation, notation addition, and the like even after, e.g., scan operation (addition of digital signature/time stamp).

BRIEF DESCRIPTION OF THE DRAWINGS

FIG. 7 is a view showing feature amount information obtained by integrating the feature amounts of the meta information and content information;

FIG. 8 is a view showing an example of the content of a management card issued at the digital information registration time;

FIG. 9 is a view showing an image of a storage state at the digital information registration time;

FIG. 14 is a view showing feature amount information obtained by integrating the feature amounts of the meta information and content information of corrected digital information;

FIG. 15 is a view showing an example of the content of a management card issued at the digital information update time;

FIG. 16 is a view showing an image of a storage state at the digital information update time;

FIG. 21 is a view showing an example of merging of a plurality of documents; and FIG. 22A to 22H are view showing another use form of the second embodiment.

DETAILED DESCRIPTION OF THE PREFERRED EMBODIMENTS (Outline of Embodiment)

The outline of the embodiment of the present invention will first be described.

Figure 1:
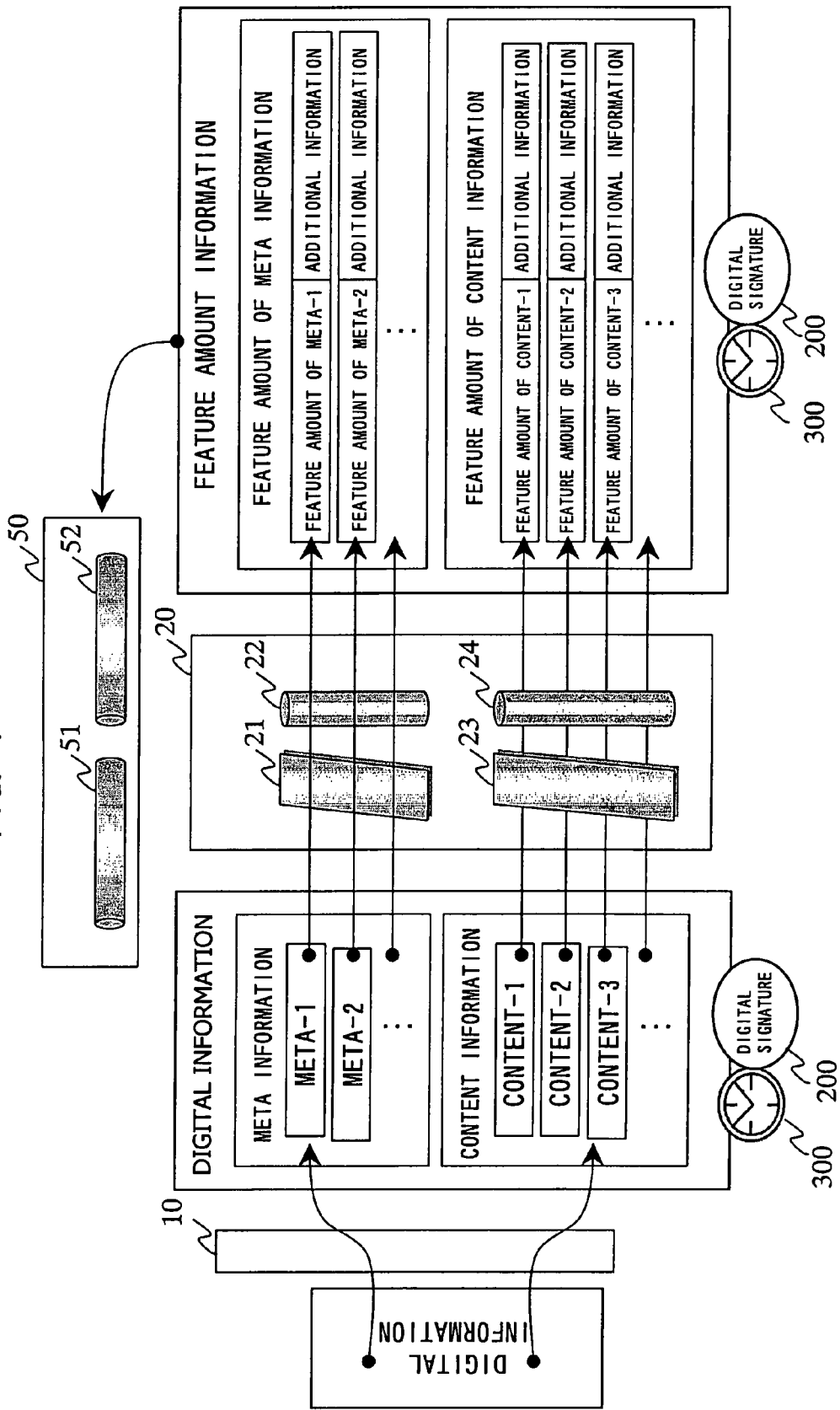
FIG. 1 is a principle view for explaining the present invention.

FIG. 1 is a principle view for explaining the outline of the embodiment of the present invention. The embodiment shown in FIG. 1 includes a digital information analysis section 10 for analyzing digital information of a digital document read out by a scanner and extracting meta information and content information from the digital document, a feature amount information generation section 20 for generating feature amount information from the meta information and content information, and a feature amount information verification section 50 for validating/verifying the feature amount information of an object to be verified.

The digital information analysis section 10 receives an input digital information, performs analysis of the digital information, and separates the digital information into meta information including information concerning a header, property, and the like of the digital information and content information including the content of the body of the digital information by the analysis processing so as to extract them. The digital information includes information read out by a not shown scanner and information transmitted from other digital information management apparatus, and the like.

The feature amount information generation section 20 includes a meta information extraction method determination section 21, a content information extraction method determination section 23, a meta information feature amount generation section 22, and a content information feature amount generation section 24.

The meta information extraction method determination section 21 and content information extraction method determination section 23 each have a function of selecting item information concerning a predetermined item respectively from the meta information and content information extracted from the digital information in a separated manner by the digital information analysis section 10 and performing determination for selecting a generation method for generating feature amount information from the selected item information (hereinafter, according to the need, these functions are collectively referred to as "selection/determination function" and information (item and generation method) obtained by the selection/determination function are collectively referred to as "selected/determined information").

The meta information feature amount generation section 22 and content information feature amount generation section 24 each have a function of generating feature amount information (meta information related parameter and content information related parameter) respectively from the meta information and content information based on the selected/determined information of the meta information extraction method determination section 21 and content information extraction method determination section 23.

The meta information includes items corresponding to a header, property, and the like. The items include version information, total number of pages, page order, rotation angle of pages, and operations (addition, change, deletion, integration, rotation) corresponding to a header or property of the digital information. The meta information extraction method determination section 21 determines, by its own selection/determination function, items to be selected when selecting given items in the meta information which is required for originality verification in the process of the present embodiment or selecting all items in the meta information.

In determining which items are to be selected, a user, that is, a manager (or a man in charge of document creation) can previously set items corresponding to the type (e.g., subject) of the digital information in a table. Alternatively, it is possible to set the item for each digital information handled. It goes without saying that information irrelevant to the integrity/originality, such as a version number of a file format storing a plurality of scanning images, need not be set in the table.

With regard to a generation method of feature amount information, the meta information extraction method determination section 21 can instruct the meta information feature amount generation section 22 to generate feature amount information according to a plurality of generation patterns (generation method) that the meta information extraction method determination section 21 has selected.

Examples of the generation pattern include, for example, a pattern that uses a one-way hash function so as not to leak the content of the meta information to a third-party to calculate a hash value from the meta information to generate the feature amount information, pattern that uses the meta information, as it is, without considering a risk such as leakage to the third-party to generate the feature amount information, pattern that encodes the content of the meta information, and the like.

The meta information extraction method determination section 21 selects, on a case-by-case basis, these generation patterns of the feature amount information to generate variation in the generation pattern (method) of the feature amount information concerning the meta information.

In selecting/determining the generation pattern, a manager (or a man in charge of document creation) or a user (document user) can previously set items (generation patterns) corresponding to the type (e.g., subject) of the digital information in a table. Alternatively, it is possible to randomly or sequentially select some generation patterns for each digital information or meta information handled.

The meta information feature amount generation section 22 generates the feature amount information of the meta information based on the meta information and feature amount generation pattern obtained by the meta information extraction method determination section 21.

The meta information feature amount generation section 22 adds, to the generated respective feature amount information, information indicating to which item (meta information) of a plurality of meta information the generated feature amount information corresponds and information indicating the feature amount information generation method, as additional information and allows the respective feature amount information and addition information to be processed independently from the digital information.

The content information extraction method determination section 23 determines items to be selected, by its selection/determination function, when selecting given items in the plurality of content information which is required for originality verification in the process of the present embodiment or selecting all items in the content information.

The content information extraction method determination section 23 can select the items in units of a document (page) or, select, according to the need, a given part in each document (page).

It goes without saying that the content information selected by the content information extraction method determination section 23 and meta information selected by the meta information extraction method determination section 21 are associated with the same digital information.

As in the case of the meta information extraction method determination section 21, in determining which items are to be selected, a user, that is, a manager (or a man in charge of document creation) can previously set items corresponding to the type (e.g., subject) of the digital information in a table. Alternatively, it is possible to set the item for each digital information handled.

With regard to a generation method of feature amount information, the content information extraction method determination section 23 can instruct the content information feature amount generation section 24 to generate feature amount information according to a plurality of generation pattern (generation method) that the content information extraction method determination section 23 has selected.

Examples of the generation pattern include, for example, a pattern that uses a one-way hash function so as not to leak the content of the content information to a third-party to calculate a hash value from the content information to generate the feature amount information, pattern that uses the content information, as it is, without considering a risk such as leakage to the third-party to generate the feature amount information, and pattern that encodes the content of the content information, pattern that extracts a statistics value of the content of the content information, and the like.

The content information extraction method determination section 23 selects, on a case-by-case basis, these generation patterns of the feature amount information to generate variation in the generation pattern (generation method) of the feature amount information concerning the content information.

As in the case of the meta information extraction method determination section 21, in selecting/determining the generation pattern, a manager (or a man in charge of document creation) or a user (document user) can previously set items (generation patterns) corresponding to the type (e.g., subject) of the digital information in a table. Alternatively, it is possible to randomly or sequentially select some generation patterns for each digital information or content information handled.

For originality verification, the meta information extraction method determination section 21 and content information extraction method determination section 23 can operate in collaboration with other to determine the meta information to be selected in correspondence with the type (e.g., subject) of the digital information and its feature amount generation pattern and content information to be selected and its feature amount generation pattern. That is, the meta information and content information to be selected are determined such that they are associated with each other like an after-mentioned relationship between page information (meta information) and its content (content information) or between operations and the content (content information) concerning the operations.

The content information feature amount generation section 24 generates the feature amount information of the content information based on the content information and feature amount generation pattern obtained by the content information extraction method determination section 23.

Thus, the feature amount information is generated, for example, in units of a document (page), or, according to the need, generated with respect to a given part in each document (page).

The content information feature amount generation section 24 adds, to the generated respective feature amount information, information indicating to which content information (to which part in a document) of a plurality of content information (document) the generated content information corresponds and information indicating the feature amount information generation method, as additional information and allows the respective feature amount information and addition information to be processed independently from the digital information.

The feature amount information generation section 20 integrates the feature amount information of the meta information and that of the content information for registration. At this time, feature amount information generation section 20 adds a digital signature 200 and time stamp 300 respectively to the entire digital information and entire integrated feature amount information.

The feature amount information verification section 50 includes a meta information verification section 51 having a function of comparing the respective feature amount information (items) of old and new meta information to be verified to certify/verify the presence/absence of any change for each item and a content information verification section 52 having a function of comparing the respective feature amount information (items) of old and new content information to be verified to certify/verify the presence/absence of any change for each item, thereby supporting certification/verification of the feature amount information to be verified.

[First Embodiment]

Figure 2:
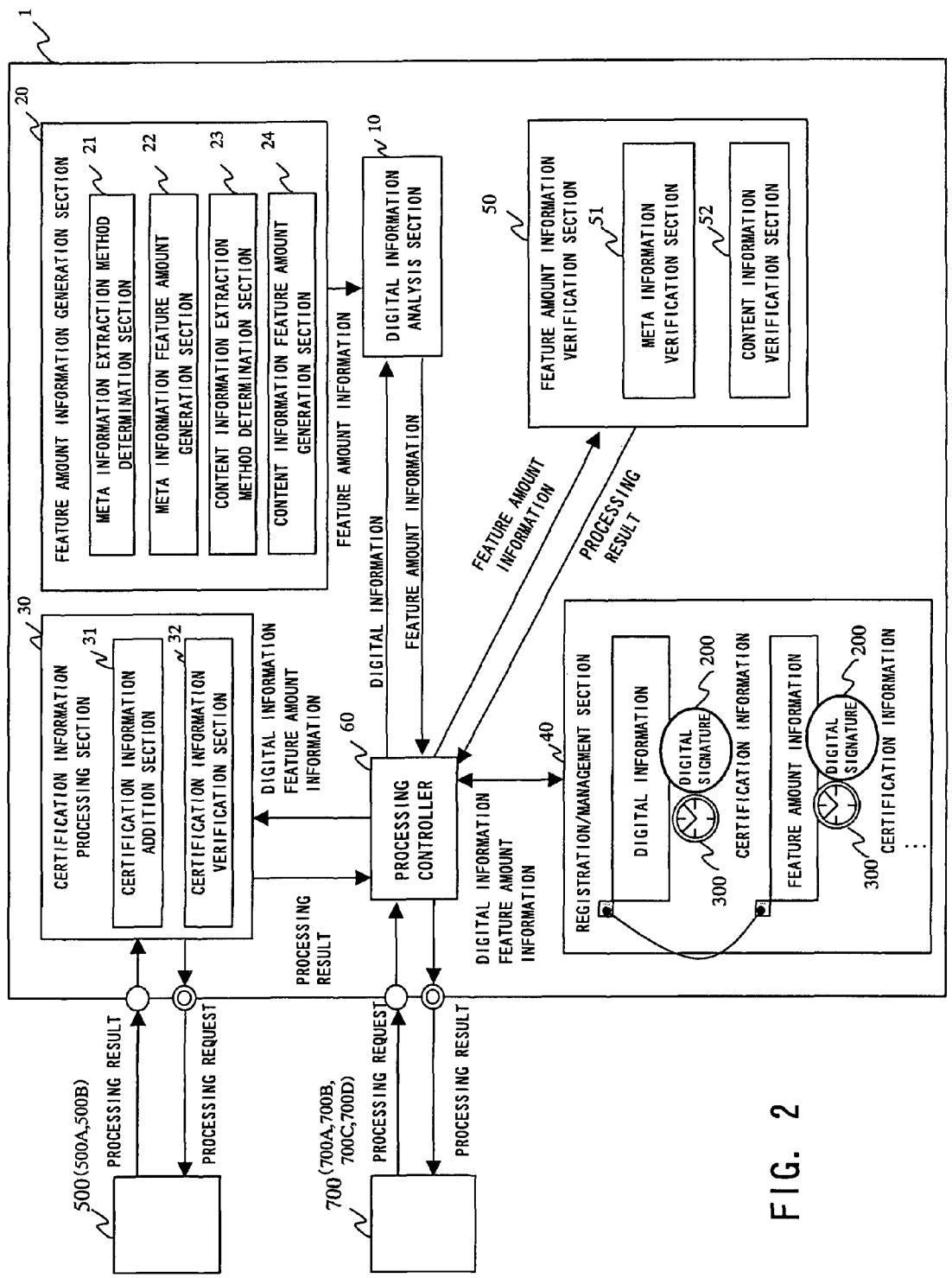
FIG. 2 is a view showing a configuration of an embodiment of the present invention.

The embodiment of the present invention will be described more concretely with reference to FIG. 2. FIG. 2 is a block diagram showing a digital information verification apparatus according to the embodiment of the present invention.

A digital information verification apparatus (digital information originality verification system) 1 shown in FIG. 2 includes an digital information analysis section 10, a feature amount information generation section 20, a certification information processing section 30, a registration/management section 40, a feature amount information verification section 50, and a processing controller 60.

The digital information analysis section 10 receives digital information analysis request from the processing controller 60 to be described later and performs the above-mentioned operation. Since the configurations and operations of the digital information analysis section 10 and feature amount information generation section 20 have been described in the outline of the embodiment shown in FIG. 1, descriptions thereof will hereinafter be omitted.

The certification information processing section 30 receives a certification information processing request from the processing controller 60 and performs acquisition/addition/verification of certification information required for third-party certification. The certification information concretely means information such as the digital signature 200, time stamp 300, and the like. The certification information is afterward used as information required to certify, when, who creates digital information and feature amount to be verified or that the digital information and feature amount have not been changed from the time at which the target information are newly created, to a third party.

The digital signature 200 is issued by CA (Certificate Authority) 500A and time stamp 300 is issued by TA (Time Authority) 500B. Thus, as the digital signature 200 and time stamp 300, those issued by public third-party organizations are used. This increases believability and truthfulness of the information (digital information and time stamp), allowing strict third-party certification to be performed.

A role of the certification information processing section 30 in the present embodiment is to acquire the digital signature 200 and time stamp 300 respectively from the CA 500A and TA 500B and adding them to the entire digital information and entire feature amount information and, after that, performs verification of the digital information using the digital signature 200 and time stamp 300.

The certification information processing section 30 is constituted by two sub-elements: a certification information addition section 31 and a certification information verification section 32.

The certification information addition section 31 performs acquisition/addition of certification information for the digital information and feature amount information, to which certification information is to be added, received from the processing controller 60 to be described later.

The certification information verification section 32 performs verification of certification information for the digital information and feature amount information, to which certification information is to be added, received from the processing controller 60.

The registration/management section 40 receives a registration/management request from the processing controller 60 and performs association between the digital information, feature amount information and certification information for registration/management.

Although the certification information is included respectively in the digital information and feature amount information as a management form of the registration/management section 40 shown in FIG. 2, the certification information may be managed independently of the digital information and feature amount information. In the present embodiment, the management form in which the certification information is included respectively in the digital information and feature amount information is employed.

The feature amount information verification section 50 receives a feature amount information verification request from the processing controller 60 together with old and new feature amount information to be verified and performs verification of the feature amount information to be verified.

The feature amount information verification section 50 is constituted by two sub-elements: a meta information verification section 51 and a content information verification section 52.

The meta information verification section 51 compares the respective feature amount information (items) of the meta information corresponding respectively to at least two old and new digital information to be verified received from the processing controller 60 to certify/verify the presence/absence of any change for each item.

Similarly, the content information verification section 52 compares the respective feature amount information (items) of the content information corresponding respectively to at least two old and new digital information to be verified received from the processing controller 60 to certify/verify the presence/absence of any change for each item.

The processing controller 60 plays a main role in the digital information verification apparatus 1. The processing controller 60 issues a processing request to the respective sections described above and receives a request therefrom and performs a predetermined notification to a user 700.

The configurations and roles of the respective sections of the digital information verification apparatus 1 have been described above. In the following, an application example of the digital information verification apparatus 1 will be described in line with usage scene.

As an example in which a user utilizes the digital information verification apparatus 1, consider the situation in which the user scans a binder (paper document composed of a single or plurality of pages) by a scanner to obtain a digitized document (corresponding to aforementioned "digital information") and adds the digital signature 200 and time stamp 300 to the digitized document so as to storage the digitized document.

As described above, the above series of operations correspond to the operation process of generating digitized document from a paper document in the existing e-document law. It can be assumed that the already-stored digitized document to which the digital signature 200 and time stamp 300 have been added is afterward taken according to the need and the following operation is performed.

More specifically, there can be assumed operations to be performed in the case where the user confirms that a given document (page) is inclined in an unintended direction (angle) as a result of the digitization process by scanning and corrects it, where the user adds a comment such as a search keyword, notation, or the like, a note, or supporting data in each document (page), and where the user performs a change of the order of documents (pages), partial insertion/deletion, or the like.

Even if such operations are performed for the already-stored digitized document to which the digital signature 200 and time stamp 300 have been added, it is required to detect such operations and to assure authenticity/integrity of the document (page) in the binder.

More specifically, it is required to be able to distinguish changed documents (pages) and unchanged documents (pages), to certify that the documents (pages) other than the changed parts are unchanged, and to identify the creator of the digitized document (original document) or identify a user who has changed the document (page). Thus, assurance of evidence/certification for the series of operations is required. Further, for example, it is required to be able to certify that the content of the original document has not been changed although only a rotation error at the scan time has been corrected.

Thus, the user uses the digital information verification apparatus 1 as a means for exhibiting the records as evidence if embroiled in court cases afterward, or when performing third-party certification of the digitized document.

In the present embodiment, a case where the user performs correction of the rotation error at the scan time will be described. It is assumed that the binder is composed of three pages.

There appear the following three characters in the present scene: a digitized operator (client as digitized operator) 700A who scans the binder (paper document) using a scanner and registers the obtained digitized document in the digital information verification apparatus 1; an operator in charge of making change (client in charge of making change) 700B who takes out the digitized document registered by the digitized operator 700A from the digital information verification apparatus 1, corrects the rotation error, and re-registers the corrected digitized document in the digital information verification apparatus 1; and an operator in charge of verification (client in charge of verification) 700C who performs third-party certification of the digitized document registered in the digital information verification apparatus 1. The above three operators use the digital information verification apparatus 1 to perform the following processes.

(Process 1: Create)

The digitized operator 700A scans a binder (paper document) using a scanner to obtain a digitized document and inputs it as digital information to thereby complete registration of the digitized document in the digital information verification apparatus 1.

(Process 2: Change)

In the process 2, a rotation error of a given page at the scan time is detected and the paper is rotated. The operator in charge of making change 700B performs the rotation operation for the digitized information registered by the digitized operator 700A and, after that, re-registers it in the digital information verification apparatus 1.

(Process 3: Verify)

After completion of the above processes 1 and 2, the operator in charge of verification 700C identifies the changed part and certifies unchanged part, followed by verification of the identification and certification.

In the above scene, the digital information verification apparatus 1 provides the following three functions respectively to the digitized operator 700A, operator in charge of making change 700B, and operator in charge of verification 700C.

(A) Registration function (utilized by digitized operator 700A at registration time of digitized information)

(B) Update function (utilized by operator in charge of making change 700B at change time of digitized information)

(C) Verification function (utilized by operator in charge of verification 700C at verification time of digitized information)

In the following, operations in the respective events (A) to (C) will be described in detail.

As a precondition in this scene, user authentication information of the digitized operator 700A, operator in charge of making change 700B, and operator in charge of verification 700C have previously been registered in the digital information verification apparatus 1 so that they can utilize the digital information verification apparatus 1, and strict access control is implemented therein. The scene is started when the respective digitized operator 700A, operator in charge of making change 700B, and operator in charge of verification 700C access/login the digital information verification apparatus 1.

Figure 3:
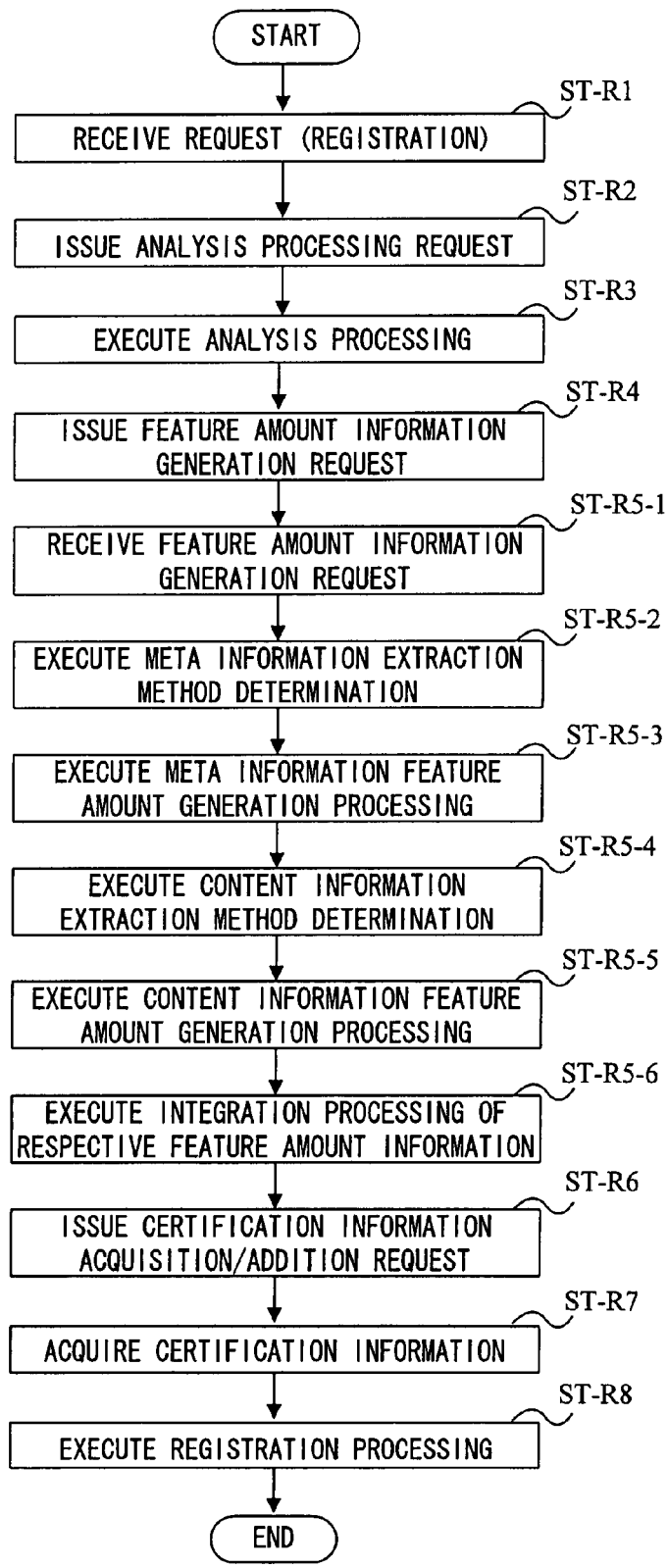
FIG. 3 is a flowchart of registration processing.

Firstly, registration of the digital document performed by (A) will be described. FIG. 3 is a flowchart of the registration processing.

The digitized operator 700A sets a binder (paper document) in an auto document feeder provided in a scanner and depresses a scan button. An image of the captured binder is displayed on a screen. The digitized operator 700A then selects "registration" menu and depresses a determination button to issue a digital information registration request to the processing controller 60 in the digital information verification apparatus 1. Thus, the digital information is forwarded to the processing controller 60.

The processing controller 60 receives the digital information registration request (step ST-R1) and issues an analysis processing request to the digital information analysis section 10 together with the input digital information as parameters (step ST-R2).

The digital information analysis section 10 executes analysis processing for the received digital information (step ST-R3). The digital information analysis section 10 separates the digital information into meta information concerning information such as version information, total number of pages, order of pages, angle of rotation of each page corresponding to a header and property and respective operations related to the digital information extracted by the analysis processing and content information including the content of the body of the digital information.

Figure 4:
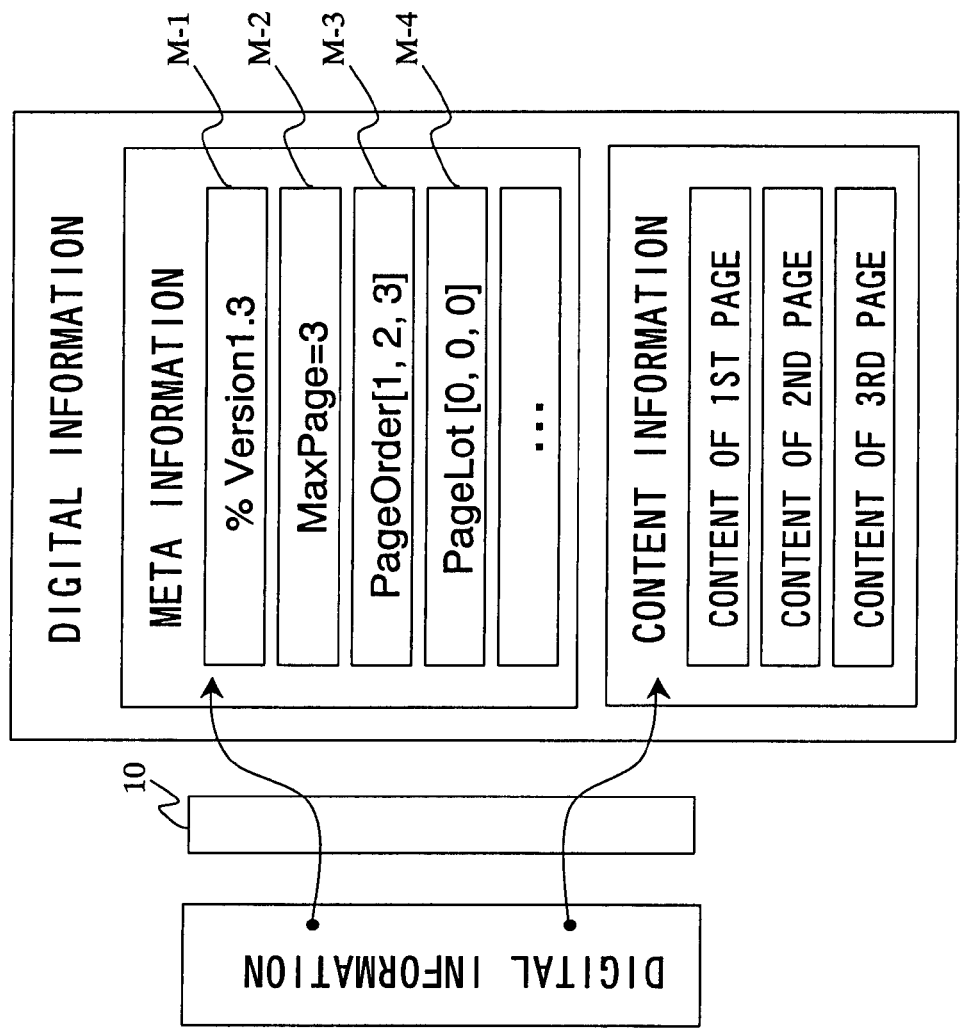
FIG. 4 is a view showing digital information analysis processing.

FIG. 4 shows a state where the digital information has been separated into the meta information and content information. As shown in FIG. 4, the binder (paper document) composed of three pages is captured as digital information and the digital information is separated into the meta information and content information by the digital information analysis section 10.

Further, as shown in FIG. 4, information such as version information ("1.3" (M−1)), total number of pages ("3" (M−2)), page order ("1→2→3" (M−3)), rotation angle of each page (rotation angles of all pages are "0" (M−4)), and the like are extracted as the meta information, and the contents of the document body from pages 1 to 3 are arranged as the content information. The content information and meta information are extracted from the same digital information or the same part in the same digital document and, thus, have a constant relationship to each other.

Subsequently, the digital information analysis section 10 issues a feature amount information generation request to the feature amount generation section 20 together with the separated meta information and content information as parameters (step ST-R4).

The feature amount generation section 20 receives the feature amount information generation request from the digital information analysis section 10 (step ST-R5-1) and starts feature amount generation processing for the meta information in the first place.

The meta information extraction method determination section 21 in the feature amount generation section 20 makes determination about selection of items to be extracted and selection regarding a generation method of the feature amount information by the above-mentioned selection/determination function (step ST-R5-2). More specifically, the meta information extraction method determination section 21 makes determination processing to select, on a case-by-case basis, given items in the meta information which is required for originality verification in the process of the present embodiment or select all items in the meta information.

In the present embodiment, the present invention is applied to a case where the rotation error (error of the direction of the document relative to the scanning direction) of a document at the scan time is corrected. Therefore, the feature amount information of the rotation angle (M−4) of each page is naturally generated and, in addition, the feature amount information of the total number of pages (M−2) and page order (M−3) are also generated in the present embodiment.

It is assumed in this example that determination information concerning the items to be extracted of the meta information is previously determined before the operation of the present embodiment and is retained in the meta information extraction method determination section 21 as a definition body. As described above, by adopting a method that selects, on a case-by-case basis, given items in the meta information which is required for originality verification, data of the meta information feature amount can be reduced.

Further, the meta information extraction method determination section 21 selects, on a case-by-case basis, a generation pattern of the feature amount information from among a pattern that uses a one-way hash function so as not to leak the content of the meta information to a third-party to calculate a hash value, pattern that uses the meta information, as it is, without considering a risk such as leakage to the third-party, and pattern that encodes the content of the meta information, and the like.

The present embodiment assumes, especially, a case where the rotation error of a document at the scan time is corrected. Therefore, in this case, a generation pattern that uses the content of the meta information, as it is, is selected in order to check the rotation angle (M−4) of each page has been changed from that at the time of creation time, that is, in order to check how the correction has been made to the rotation angles of all pages whose rotation angles at the digital document creation time were 0°.

The generation method of the feature amount information of the meta information is, as described in the above outline, selected, on a case-by-case basis, depending on the items in the meta information and, as in the case of the determination about the items to be extracted, is previously determined before the operation of the present embodiment and retained in the meta information extraction method determination section 21 as a definition body.

Then, the meta information feature amount generation section 22 acquires information (selection/determination information) for generating the feature amount information from the meta information extraction method determination section 21 and, based on the information, generates the feature amount information of the meta information (step ST-R5-3).

Figure 5:
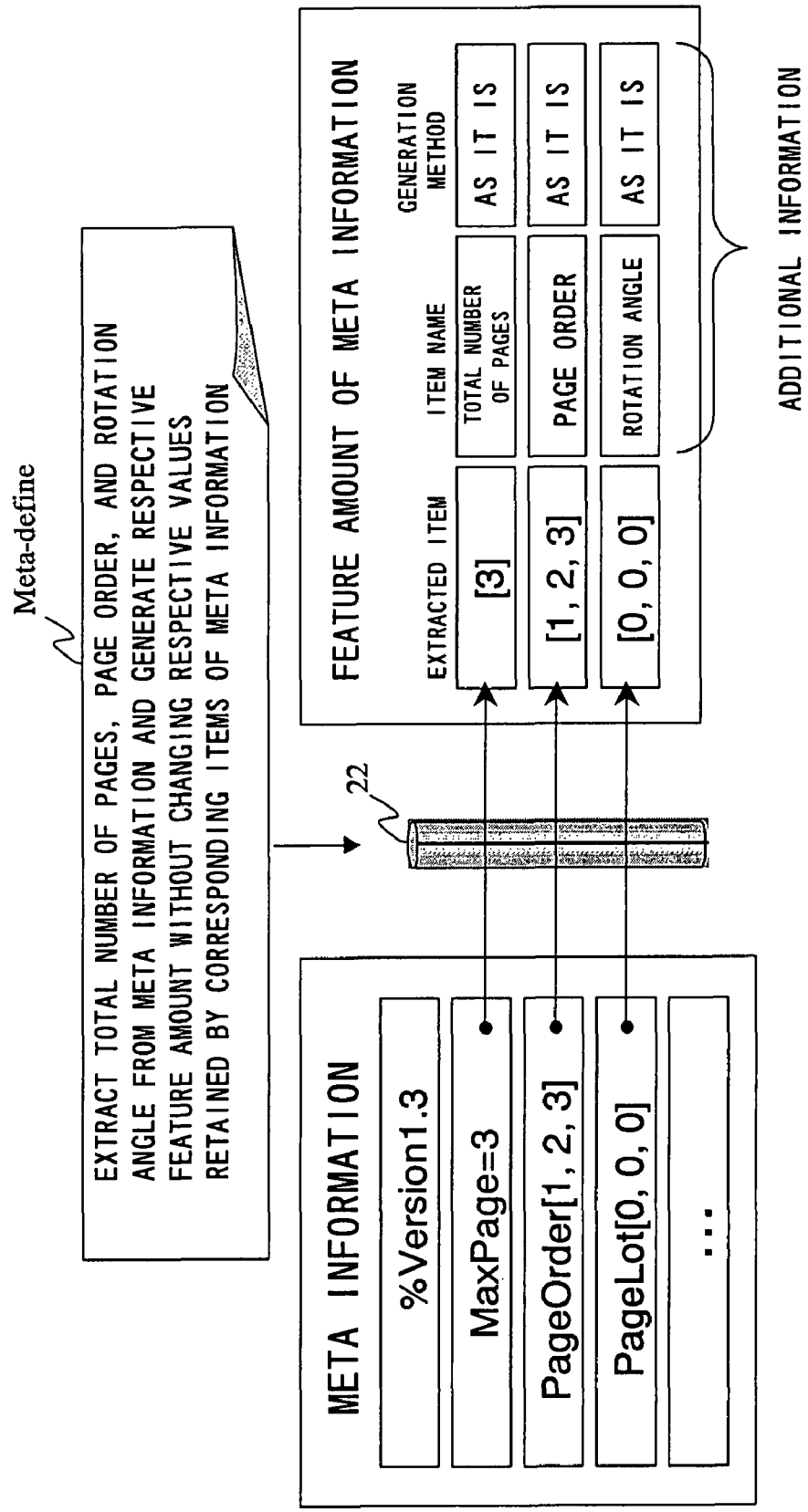
FIG. 5 is a view showing feature amount information generation processing of meta information.

FIG. 5 shows a state where the feature amount information of the meta information is generated. As shown in FIG. 5, the meta information feature amount generation section 22 generates the feature amount of the meta information according to the selection/determination information (Meta-define). At this time, in order to associate the meta information and feature amount information, meta information feature amount generation section 22 records information, as "item name", indicating to which item in the meta information each feature amount information corresponds and records another information indicating the generation method of the feature amount information (in the case of the present embodiment, expression "as it is" is recorded).

This allows a user to confirm, afterward, that the information such as total number of pages, page order, and rotation angle are recorded as extracted items without modification. In the present embodiment, "item name" and "generation method" each correspond to additional information. Although the feature amount information is recorded without changing respective forms retained by the corresponding items of the meta information in the present embodiment, the feature amount information may be converted into a hash value or encoded depending on the selection/determination information (Meta-define).

Then, feature amount generation processing of the content information is executed (step ST-R5-4). That is, the content information extraction method determination section 23 in the feature amount generation section 20 makes determination about items to be extracted and a generation method of the feature amount information.

In the present embodiment, a description will be made focusing a case where originality verification is performed, page by page, for all three pages in the binder, although it can be assumed in some cases that the originality verification is performed only for 1st and 2nd pages or performed in more detail for a given item or part in the page.

The determination information concerning the items to be extracted is previously determined before the operation of the present embodiment and is retained in the content information extraction method determination section 23 as a definition body. As described above, by adopting a method that selects, on a case-by-case basis, given items in the content information which is required for originality verification, data of the content information feature amount can be reduced.

Further, the content information extraction method determination section 23 selects, on a case-by-case basis, a generation pattern of the feature amount information from among a pattern that uses a one-way hash function so as not to leak the content of the content information to a third-party to calculate a hash value, pattern that uses the content information, as it is, without considering a risk such as leakage to the third-party, pattern that encodes the content of the content information, and pattern that extracts a statistics value of the content of the content information, and the like.

"To extract a statistics value" is the generation pattern of the feature amount information, in which a predetermined statistics value is previously acquired from the content information and, based on the acquired value, the feature amount information is generated. For example, assume that there exists binary data "0010110100011100" as the content information. In this case, if the total number of "1" is odd, 'a' is recorded. Such a statistical processing method is used to output the statistics value for generation of the feature amount information in some cases.

Thus, only one bit is required for recording 'a', so that, as compare to a case where 16 bits of the above binary data is recorded without change, it is possible to reduce the feature amount information (PIAT signature information).

In the present embodiment, a method that uses a one-way hash function to calculate a hash value is selected in order to prevent leakage of the content information. The generation method of the feature amount information of the content information is selected, on a case-by-case basis, depending on the items in the content information and, as in the case of the determination about the items to be extracted, is previously determined before the operation of the present embodiment and retained in the content information extraction method determination section 23 as a definition body.

Then, the content information feature amount generation section 24 acquires selection/determination information for generating the feature amount information from the content information extraction method determination section 23 and, based on the selection/determination information, generates the feature amount information of the content information (step ST-R5-5).

Figure 6:
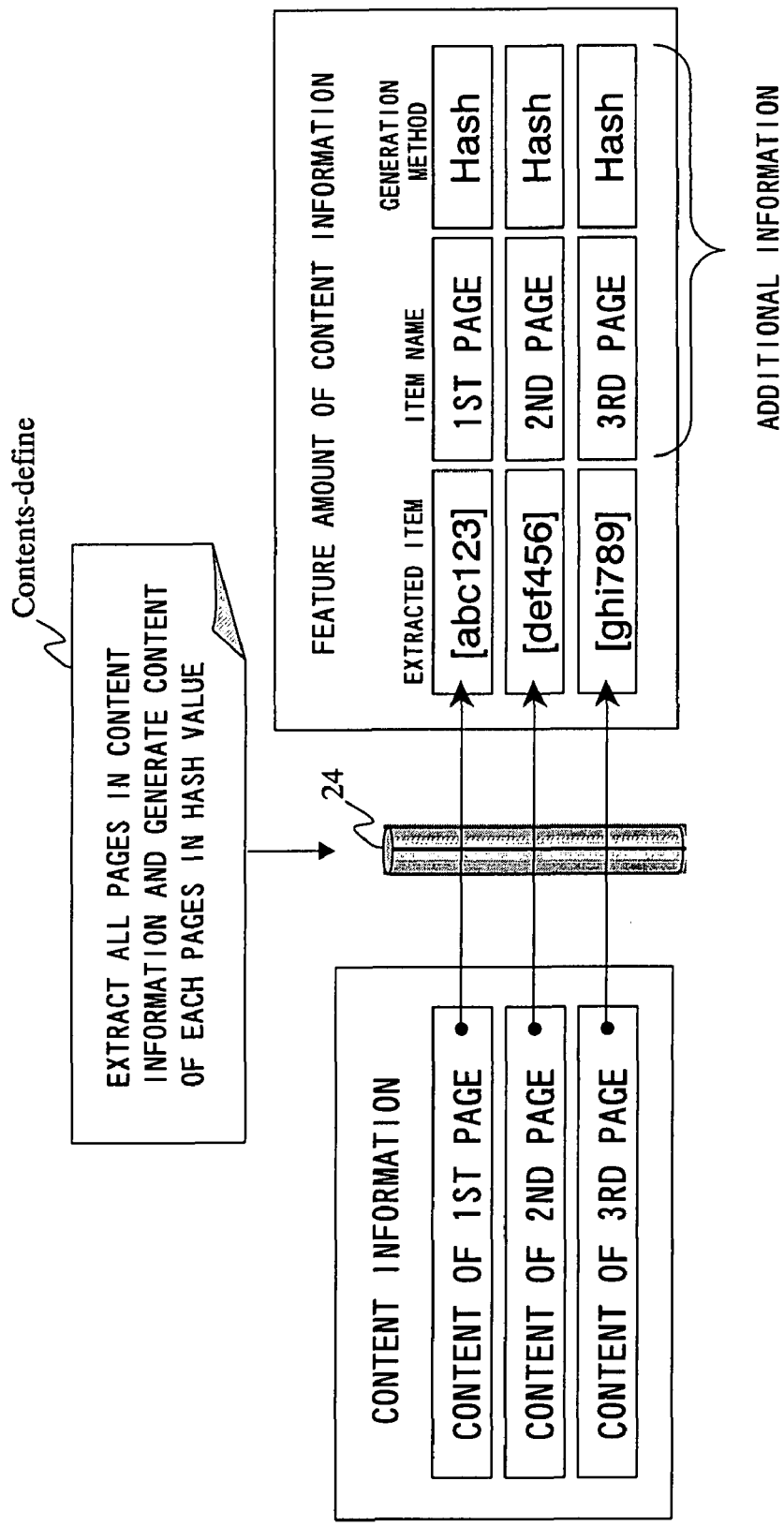
FIG. 6 is a view showing feature amount information generation processing of content information.

FIG. 6 shows a state where the feature amount information of the content information is generated. As shown in FIG. 6, the content information feature amount generation section 24 generates the feature amount of the content information according to the selection/determination information (Contents-define). At this time, in order to associate the content information and feature amount information, content information feature amount generation section 24 records information, as "item name", indicating to which item in the content information each feature amount information corresponds and records another information indicating the generation method of the feature amount information (in the case of the present embodiment, expression "Hash" (indicating that a hash value has been calculated using a one-way hash function) is recorded).

This allows a user to confirm, afterward, that the contents of the document body from pages 1 to 3 are recorded as extracted items as hash values.

For example, [abc123] is calculated/recorded as the feature amount corresponding to the content information of 1st page. Similarly, [dfe456] and [ghi789] are calculated/recorded as the feature amounts corresponding to the content information of 2nd and 3rd pages, respectively.

In the present embodiment, "item name" and "generation method" each correspond to additional information. Further, in the generation of the feature amount information, random numbers or date and time information may be added to the content information in calculating a hash value using a one-way hash function.

The reason for using the hash value is to prevent the content of the content information from being leaked to a third-party. The one-way hash function is featured in that original content cannot be guessed from a calculated value. However, if someone calculates a hash value by guessing the content of the original content information and the calculated hash value coincides with the recorded hash value, he or she can easily confirm that the guessed content is recorded in the original document body. Thus, the random numbers or date and time information are added in order to prevent such a threat.

However, the hash value is calculated in units of a page in the present embodiment, making it difficult to guess the content of the document body (for example, the original document body is constituted by chapters, paragraphs, and the like and includes a large number of characters). Therefore, it is not always necessary to add the random numbers or date and time information. However, in the case where the feature amount is generated for a given item (e.g., name, gender, telephone number, or the like) in the page, it can be determined that the content of the document body can easily be guessed by the method described above due to less amount of information. Thus, in this case, it is better to add the random numbers or date and time information. It is desirable to select, on a caseby-case basis, whether these information should be added or not depending on the information amount of a source or situation.

Subsequently, the feature amount information generation section 20 integrates the meta information and content information (step ST-R5-6) and outputs them as one feature amount information to the digital information analysis section 10.

FIG. 7 shows a state where the meta information and content information are integrated with each other to obtain one feature amount information.

Then, the digital information analysis section 10 sends the generated feature amount information to the processing controller 60. The processing controller 60 issues a certification information addition request to the certification information addition section 31 in the certification information processing section 30 together with a pair of digital information and feature amount information thereof as input parameters (step ST-R6).

The certification information addition section 31 makes a request for generating the digital document 200 and time stamp 300 which are required for third-party certification. At this time, a digital signature of the digitized operator 700A is used.

The certification information addition section 31 issues a request for generating the digital signatures 200 to CA 500A and a request for generating the time stamp 300 to TA 500B, as described above.

The certification information addition section 31 then sends the received pair of digital information and its feature amount information respectively to CA 500A and TA 500B and acquires digital signatures 200 and time stamps 300 corresponding respectively to the digital information and its feature amount information (step ST-R7).

After acquisition of the certification information, the certification information addition section 31 sends back the digital information and its feature amount information with certification information (digital signatures 200 and time stamps 300) to the processing controller 60.

The processing controller 60 acquires the digital information and its feature amount information with certification information from the certification information addition section 31 and issues a registration processing request to the registration/management section 40. The registration/management section 40 stores therein the respective information in an integrated manner and manages the version number thereof (step ST-R8).

After completion of the above processing, the registration/management section 40 outputs a management card indicating the completion of the digital information registration and notification indicating normal end to the digitized operator 700A. After that, the digitized operator 700A logs out, and the registration processing is normally ended. If an error has occurred, the corresponding notification is made to the digitized operator 700A, and the registration processing is aborted.

FIG. 8 shows an example of the content of the management card at the digital information registration time. The management card is managed in this system or dedicated business server as a temporary receipt and used when the subsequent process (update of the digital information, browsing thereof, or verification thereof) is performed.

As a matter of course, it is necessary to take countermeasures to detect falsification, to keep information safe from prying eyes, and the like, as well as, to establish a mechanism to at least allow only the users that can log in the system or only authorized users to access the management card.

FIG. 9 shows an image of a storage state at the digital information registration time. As shown in the image of FIG. 9, digital information ID (=8919201) is assigned as a search tag to manage respective information in association with each other. Further, the digital signatures 200 and time stamps 300 are added respectively to the digital information and feature amount information.

Figure 10:
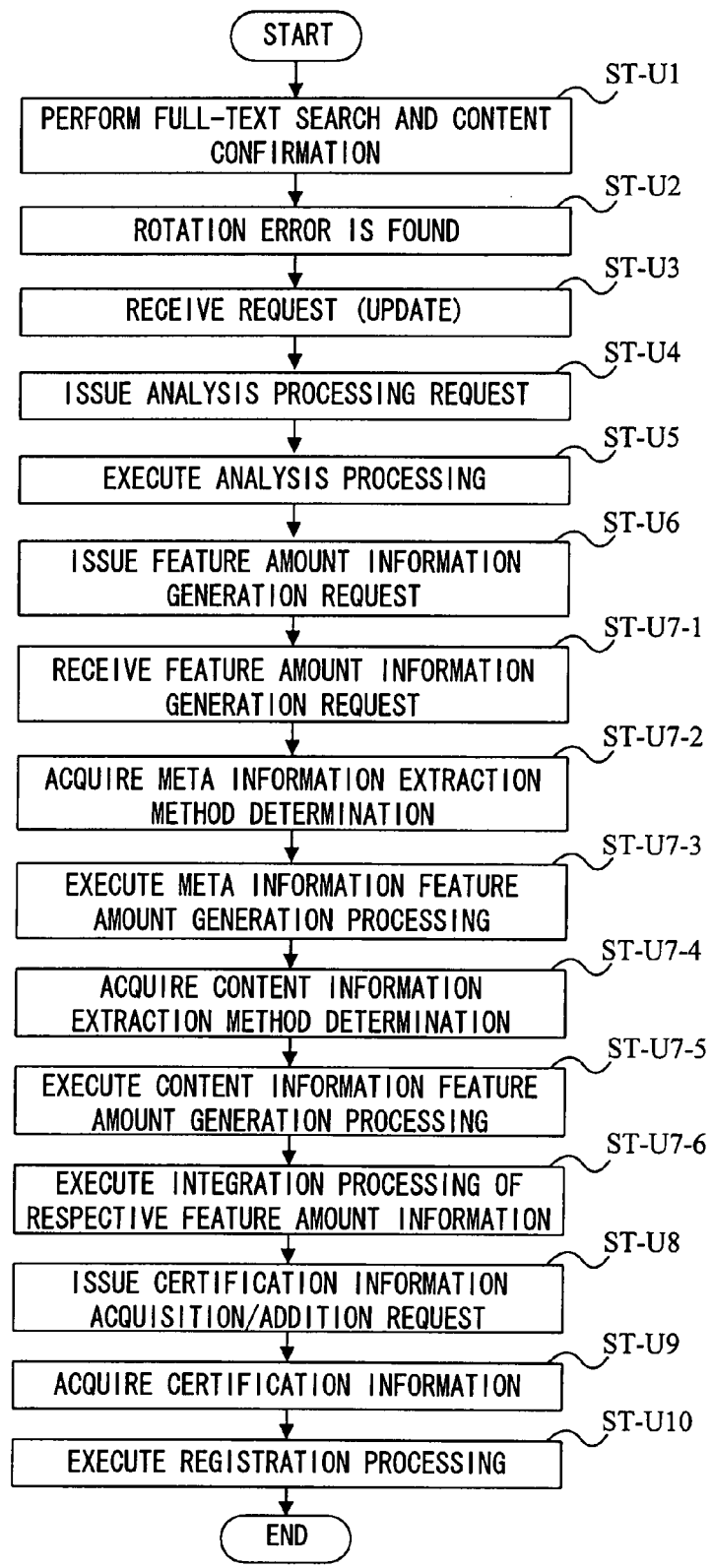
FIG. 10 is a flowchart of update processing.

These are the processing at the digital information registration time implemented by the registration function (A). Subsequently, processing at digital information update time implemented by the update function (B) will be described. FIG. 10 is a flowchart of the update processing. The operation of steps ST-U1 and ST-U2 are performed by the operator in charge of making change 700B, which starts this update processing.

The operator in charge of making change 700B performs full-text search for the digital information registered in the registration/management section 40 based on the above-mentioned management card and performs content confirmation processing for digital information displayed on a screen one by one (step ST-U1). At this time, operator in charge of making change 700B finds the rotation error at the scan time (step ST-U2). Then, operation for correcting the error is started (step ST-U3 and subsequent steps).

Figure 11:
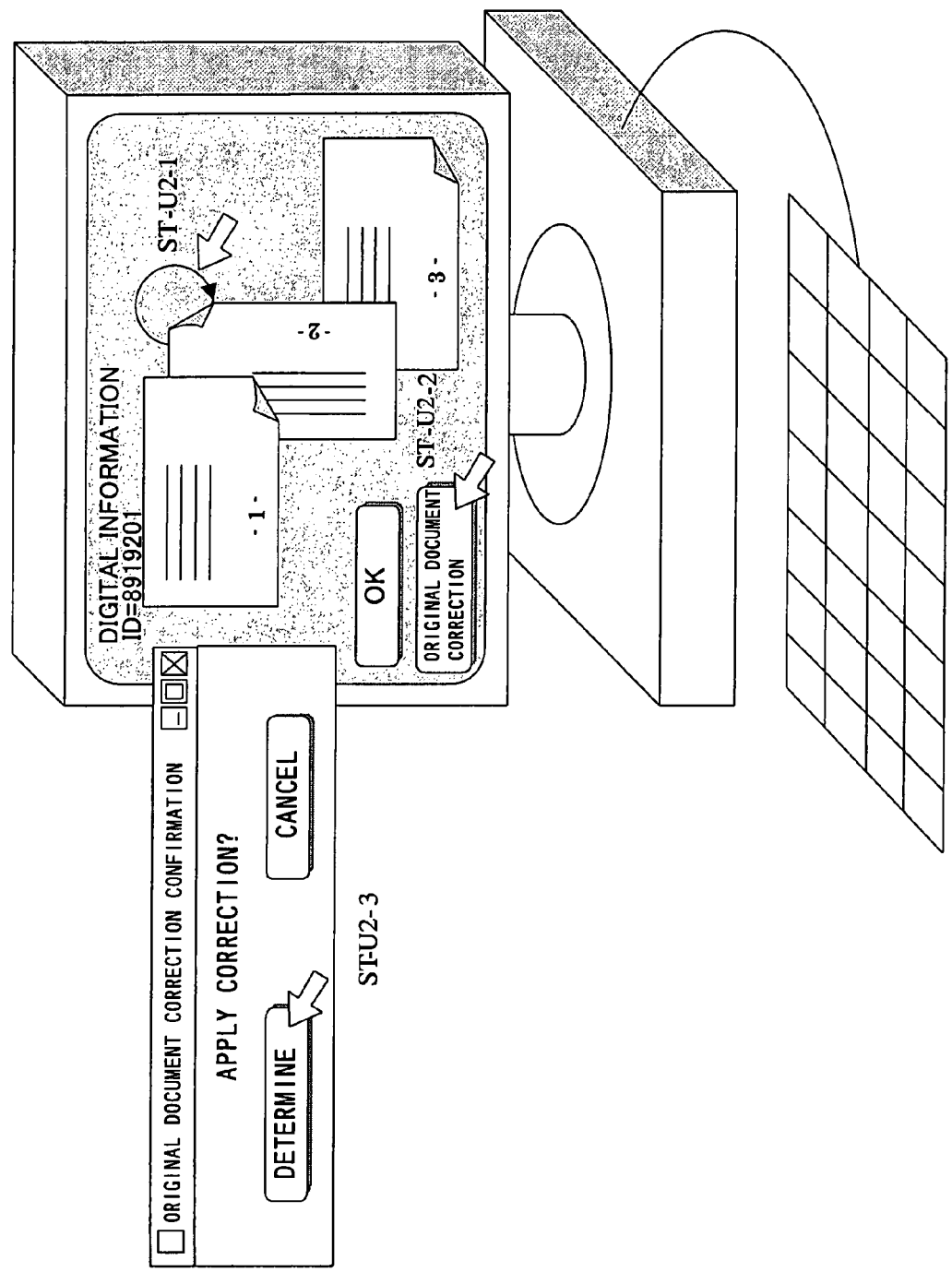
FIG. 11 is a view showing change operation performed at the time when the rotation error has been found.

FIG. 11 shows a state where the rotation error is found. It is assumed that the rotation error occurs in the 2nd page of the registered digital information with digital information ID (=8919201). That is, operator in charge of making change 700B has found that the 2nd page thereof had been inclined in an unintended direction at the time of digitization (step ST-U2).

As shown in FIG. 11, the operator in charge of making change 700B corrects the rotation error of the 2nd page of the digital information to a proper direction (step ST-U2-1). When an original document correction button is depressed after the correction (step ST-U2-2), an original document correction confirmation window is displayed. The window inquires whether the correction is applied or not, and operator in charge of making change 700B depresses a determination button (step ST-U2-3). Through the above operations, an update request associated with the correction is issued to the processing controller 60. At this time, the digital information and management card including the information indicating that the rotation error has been corrected are sent to the processing controller 60.

The processing controller 60 receives the digital information update request (step ST-U3) and issues an analysis processing request together with the input digital information as parameters to the digital information analysis section 10 (step ST-U4).

The digital information analysis section 10 executes the analysis processing for the received digital information (step ST-U5). As described in the registration processing, the digital information analysis section 10 extracts the meta information and content information in a separated manner.

Figure 12:
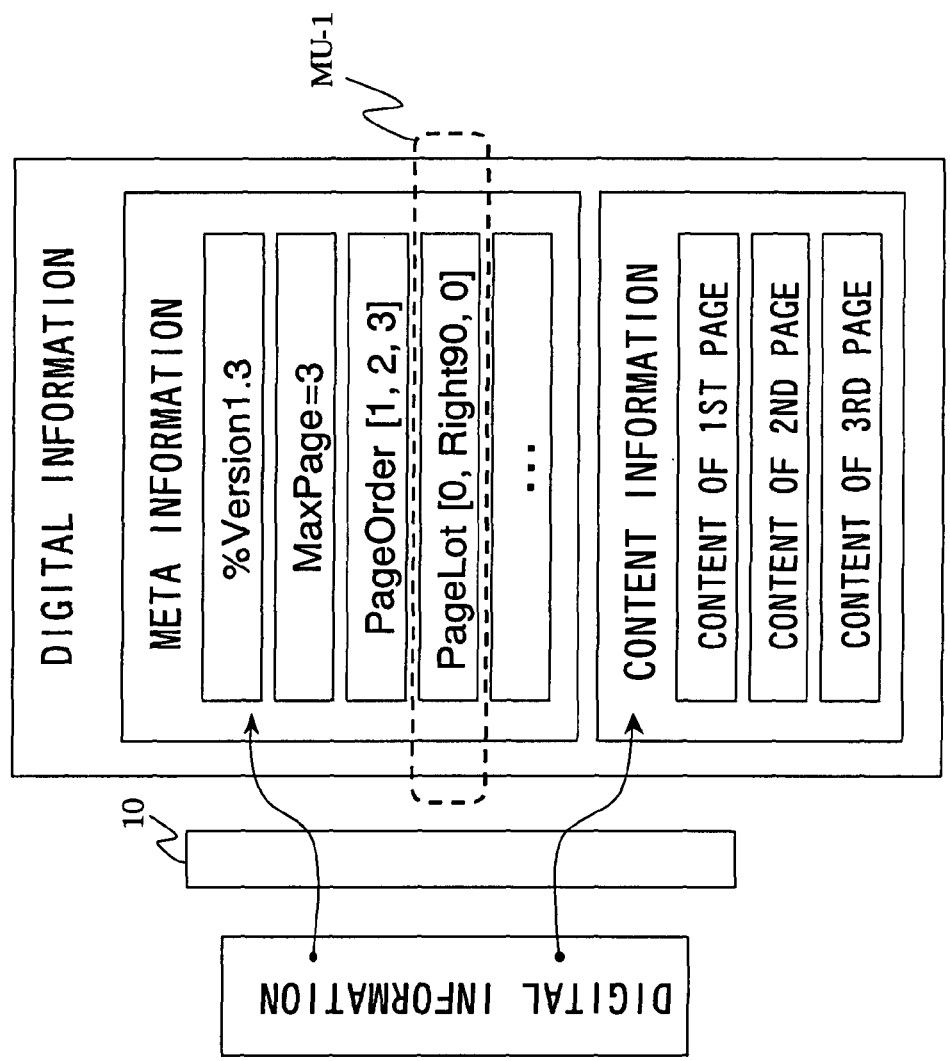
FIG. 12 is a view showing analysis processing of corrected digital information.

FIG. 12 shows a state where the analysis processing is executed. As is clear from MU-1, the rotation angle of the 2nd page has been changed to "Right 90". That is, the above operation in which the 2nd page has been rotated clockwise by 90° from the original state is extracted and recorded as PageLot in the meta information.

Subsequently, the digital information analysis section 10 issues a feature amount information generation request together with the separated meta information and content information as parameters to the feature amount information generation section 20 (step ST-U6).

The feature amount information generation section 20 receives the feature amount information generation request from the digital information analysis section 10 (step ST-U7-1) and starts feature amount generation processing for the meta information in the first place.

The meta information extraction method determination section 21 in the feature amount generation section 20 acquires the above-mentioned selection/determination information (the same information as that used at the time when the digital document is newly registered: Meta-define) for generation of the feature amount information (step ST-U7-2). Subsequently, the meta information extraction method determination section 21 sends the acquired selection/determination information to the meta information feature amount generation section 22. Then, the meta information feature amount generation section 22 generates the feature amount information of the meta information based on the selection/determination information (step ST-R7-3).

Figure 13:
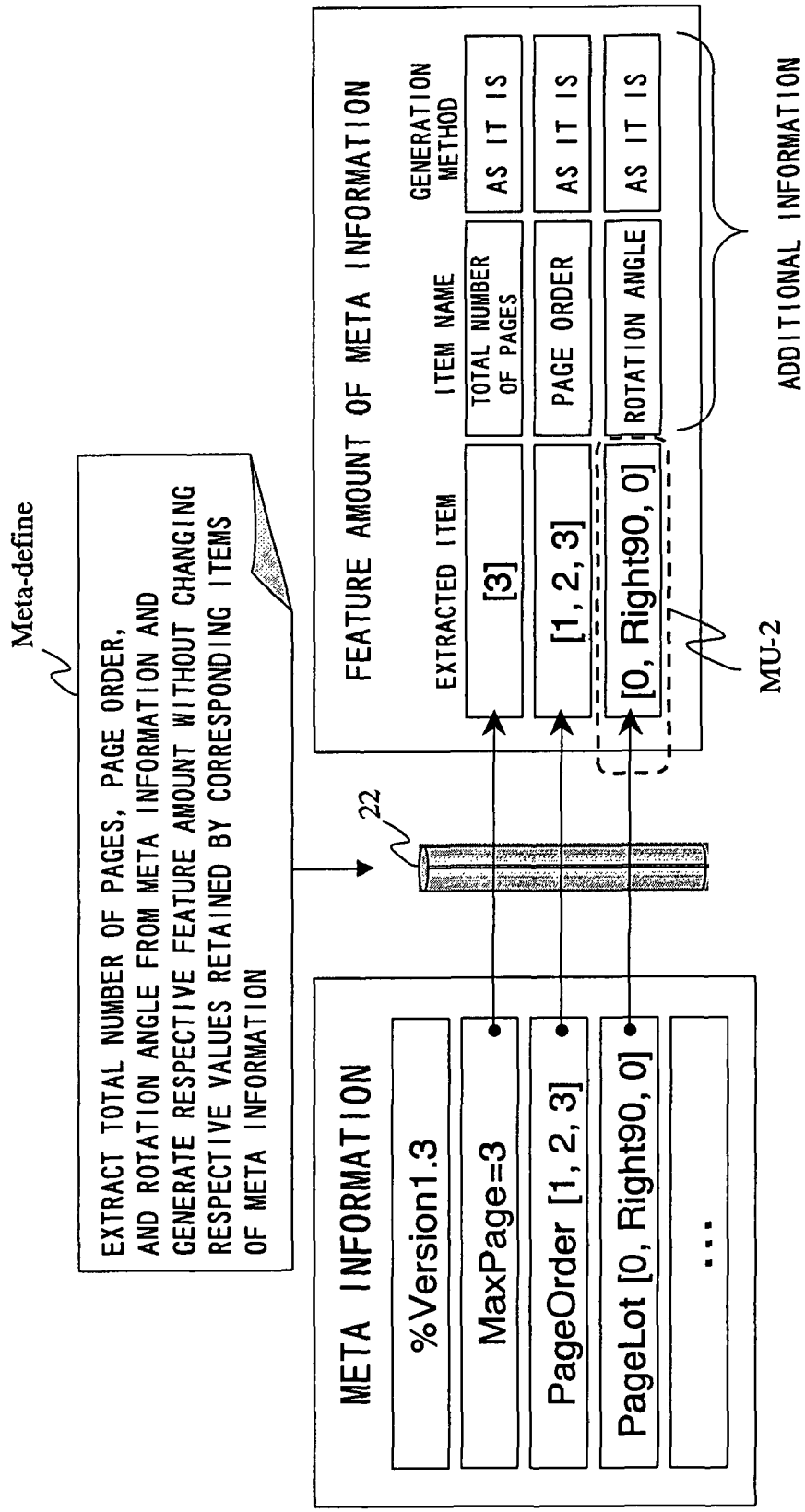
FIG. 13 is a view showing feature amount generation processing of the meta information in the corrected digital information.

FIG. 13 shows a state where the feature amount information of the meta information is generated. As shown in FIG. 13, the meta information feature amount generation section 22 generates the feature amount of the meta information according to the selection/determination information (Meta-define). MU-2 shows that information indicating that the 2nd page has been rotated clockwise by 90° from the original state is extracted and recorded as it is.

Subsequently, the feature amount generation processing of the content information is executed. The content information extraction method determination section 23 in the feature amount generation section 20 acquires the selection/determination information (the same information as that used at the time when the digital document is newly registered: Contents-define) for generation of the feature amount information (step ST-U7-4). Subsequently, the content information extraction method determination section 23 sends the acquired selection/determination information to the content information feature amount generation section 24. Then, content information feature amount generation section 24 generates the feature amount information of the content information based on the selection/determination information (step ST-R7-5).

The above processing is as shown in FIG. 6. That is, the content information feature amount generation section 24 generates the feature amount of the content information according to the selection/determination information (Contents-define). With regard to the content information after correction, the same result as that at the registration time has been acquired. This is because that even if the 2nd page has been rotated clockwise by 90° from the original state, the content itself of the content information has not been changed.

That is, the meta information including a command: "Afterward, display digital document with 2nd page rotated clockwise by 90°" is added or overwritten. Consequently, the content itself of the content information has not been changed, so that the same result as that at the registration time is acquired. As described above, in many of various editors and applications that handle unstructured document formats, the content itself of the content information is not processed in most cases, and meta information serving as display information is often processed.

Subsequently, the feature amount information generation section 20 integrates the meta information and content information (ST-U7-6) and outputs them to the digital information analysis section 10 as one feature amount information. FIG. 14 shows a state where the meta information and content information are integrated with each other to obtain one feature amount information.

Then, the digital information analysis section 10 sends the generated feature amount information to the processing controller 60. Upon receiving the feature amount information, the processing controller 60 issues a certification information addition request together with a pair of digital information and its feature amount information as input parameter to the certification information addition section 31 in the certification information processing section 30 (step ST-U8).

The certification information addition section 31 makes a request for generating the digital signatures 200 and time stamp 300 which are required for third-party certification. At this time, a digital signature of the operator in charge of making change 700B is used. The certification information addition section 31 issues a request for generating the digital signatures 200 to CA 500A and a request for generating the time stamp 300 to TA 500B, as described above. The certification information addition section 31 then sends the received pair of digital information and its feature amount information respectively to CA 500A and TA 500B and acquires digital signatures 200 and time stamps 300 corresponding respectively to the digital information and its feature amount information (step ST-U9). After acquisition of the certification information, the certification information addition section 31 sends back the digital information and its feature amount information with certification information (digital signatures 200 and time stamps 300) to the processing controller 60.

The processing controller 60 acquires the digital information and its feature amount information with certification information added from the certification information addition section 31 and issues an update processing request to the registration/management section 40. The registration/management section 40 stores therein the respective information in an integrated manner and manages the version number thereof (step ST-U10).

In the present embodiment, an old version of the digital information is not overwritten by a new version thereof, but all versions of the digital information are stored so as to allow third-party certification of each version to be achieved afterward. However, there is conceivable that a version number management in which all versions of the digital information are not retained.

After completion of the above processing, the registration/management section 40 outputs a management card indicating the completion of the digital information update and notification indicating normal end to the operator in charge of making change 700B. After that, the operator in charge of making change 700B logs out, and the update processing is normally ended. If an error has occurred, the corresponding notification is made to the operator in charge of making change 700B, and the update processing is aborted.

FIG. 15 shows an example of the content of the management card at the digital information update time. The management card shown in FIG. 15 is managed in the digital information verification apparatus 1 or dedicated business server as a temporary receipt and used when the subsequent process (update of the digital information, browsing thereof, or verification thereof) is performed. As a matter of course, it is necessary to take countermeasures to detect falsification, to keep information safe from prying eyes, and the like, as well as, to establish a mechanism to at least allow only the users that can log in the system or only authorized users to access the management card.

FIG. 16 shows an image of a storage state at the digital information update time. As shown in the image of FIG. 16, digital information ID and version number are assigned as a search tag to manage respective information in association with each other. In the window of 2nd version, the digital signatures 200-2 and time stamps 300-2 of the operator in charge of making change 700B are added respectively to the updated digital information and its feature amount information. In the window of the 1st version, the digital signatures 200-1 and time stamps 300-1 of the digitization operator 700A are added respectively to the digital information and its feature amount information. Thus, the image of FIG. 16 shows that the 1st and 2nd versions are created by the different operators. Images of all pages within the digital information of the 1st and 2nd versions represent actual image when the users browse a screen.

Although a case where the rotation error at the scan time is corrected has been described, the present embodiment is also applicable to any other various operations such as addition of a search keyword or comment (notation, etc.) by the same processing as described above.

Figure 17:
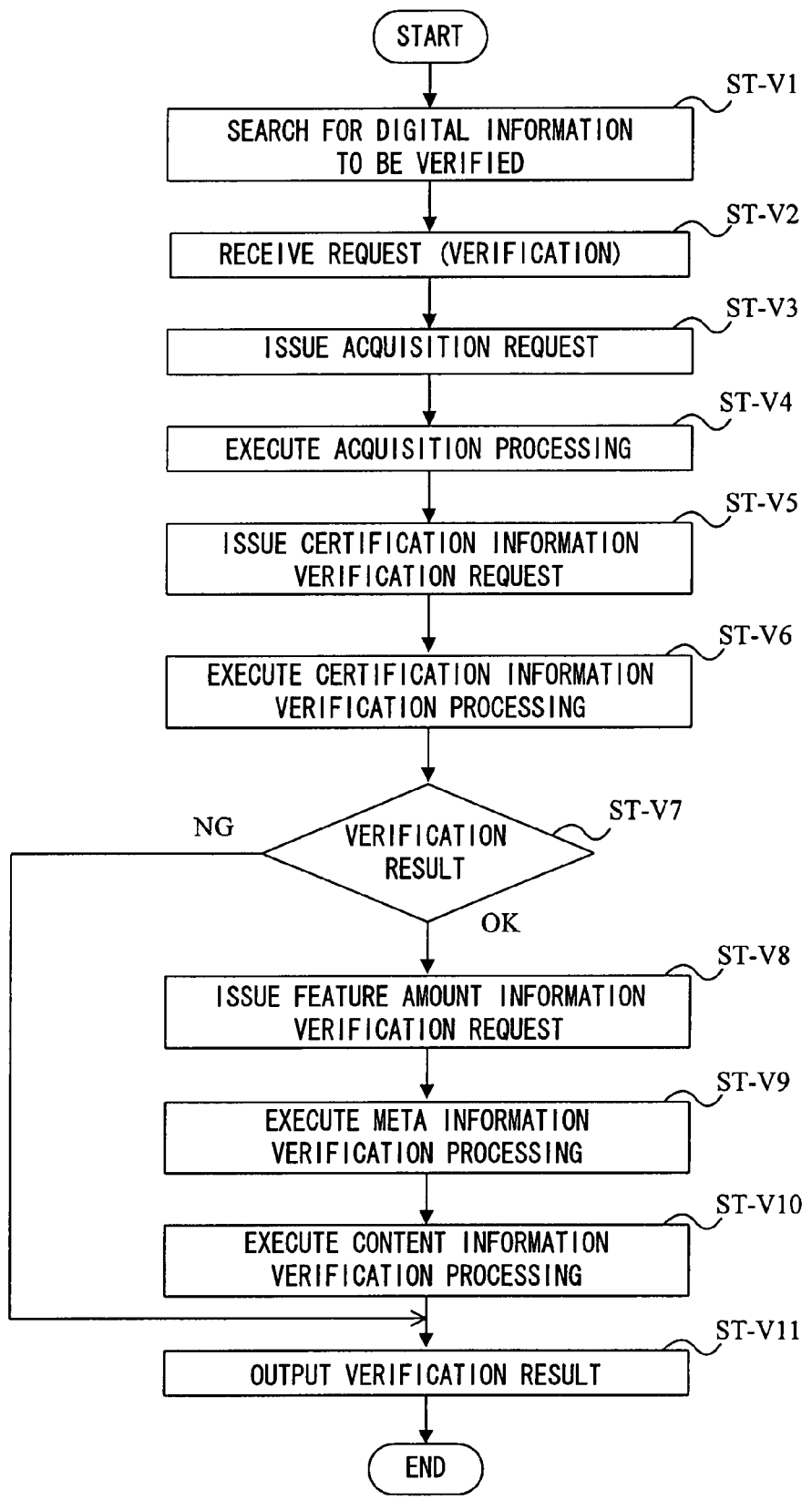
FIG. 17 is a flowchart of verification processing.

These are the processing at the digital information update time implemented by the update function (B). Subsequently, processing at digital information verification time implemented by the verification function (C) will be described. FIG. 17 is a flowchart of the digital information verification processing.

The operator in charge of verification 700C searches for digital information to be verified based on the management card of the registered digital information managed in the digital information verification apparatus 1, a dedicated business server, or the like (step ST-V1) and displays the target digital information on a screen. Subsequently, the operator in charge of verification 700C selects a "verification" menu on the screen. When a determination button is depressed, a request for verification of the digital information is issued to the processing controller 60. At this time, the management card (latest version) of the digital information to be verified is sent to the processing controller 60.

The present embodiment assumes a case where the digital information with digital information ID (=8919201) that has already been registered is verified, and the latest version (2nd version) of the management card as shown in FIG. 15 is sent to the processing controller 60. Here, a case can be assumed in which the operator in charge of verification 700C focuses heavily on the scanned document to which some sort of correction has been made and, in the present embodiment, the rotation error of the scanned digital document has been corrected, so that the operator in charge of verification 700C is likely to select the digital information as the verification target.

Further, operator in charge of verification 700C may search for the target digital information based on the subject matter described in the management card, such as "scanned document (rotation error has been corrected)". Further, in the case where a plurality of corrected digital information are managed in a list, the operator in charge of verification 700C may collectively select the plurality of corrected digital information.

The processing controller 60 receives the digital information verification request (step ST-V2) and issues a request for acquisition of the corresponding digital information and its feature amount information together with the input management card as parameters to the registration/management section 40 (step ST-V3). Upon receiving the acquisition request, the registration/management section 40 searches for the corresponding digital information based on the content of the input management card and takes out the found digital information and its feature amount information (step ST-V4). It is assumed, at this time, that registration/management section 40 receives the management card including the content of the digital information ID (=8919201) and version number (=2.0). Accordingly, the registration/management section 40 takes out two feature amount information of the digital information, i.e., feature amount information (2nd version) and previous version of feature amount information (1st version) and sends back them to the processing controller 60.

Upon receiving the two information, the processing controller 60 issues a certification information verification request to the certification information verification section 32 in the certification information processing section 30 (step ST-V5). At this time, the feature amount information (2nd version) and feature amount information (1st version) are sent to the certification information verification section 32.

Upon receiving the certification information verification request, the certification information verification section 32 executes certification information verification processing using the received two feature amount information (1st and 2nd versions) (step ST-V6). More specifically, the certification information verification section 32 issues requests for verification of the digital signatures 200 and time stamps 300 added to the two feature amount information (1st and 2nd versions) respectively to the CA 500A and TA 500B and obtains their processing results (step ST-V7).

In the case where either digital signature 200 or time stamp 300 is not appropriate as the result of the verification, the corresponding information is notified to the operator in charge of verification 700C through the processing controller 60, and the processing controller 60 ends the processing.

In the case where both digital signature 200 and time stamp 300 are appropriate, the processing is continued, and the processing controller 60 issues a feature amount information verification request to the feature amount information verification section 50 (step ST-V8). At this time, the feature amount information (2nd version) and feature amount information (1st version) are sent to the feature amount information verification section 50.

Upon receiving the feature amount information verification request, the feature amount information verification section 50 executes verification processing for the received feature amount information (2nd version) and feature amount information (1st version).

Firstly, the meta information verification section 51 executes the verification processing for the meta information (step ST-V9). In this meta information verification processing, respective items in the meta information are compared to each other using the feature amount information (2nd version) and feature amount information (1st version) which have been acquired in step ST-V4. Here, whether there has been made any change to the first version is firstly determined and, in the case where it is determined that there is any change, how the change has been made is determined, and a changed part (unchanged part) is identified (determined).

Figure 18:
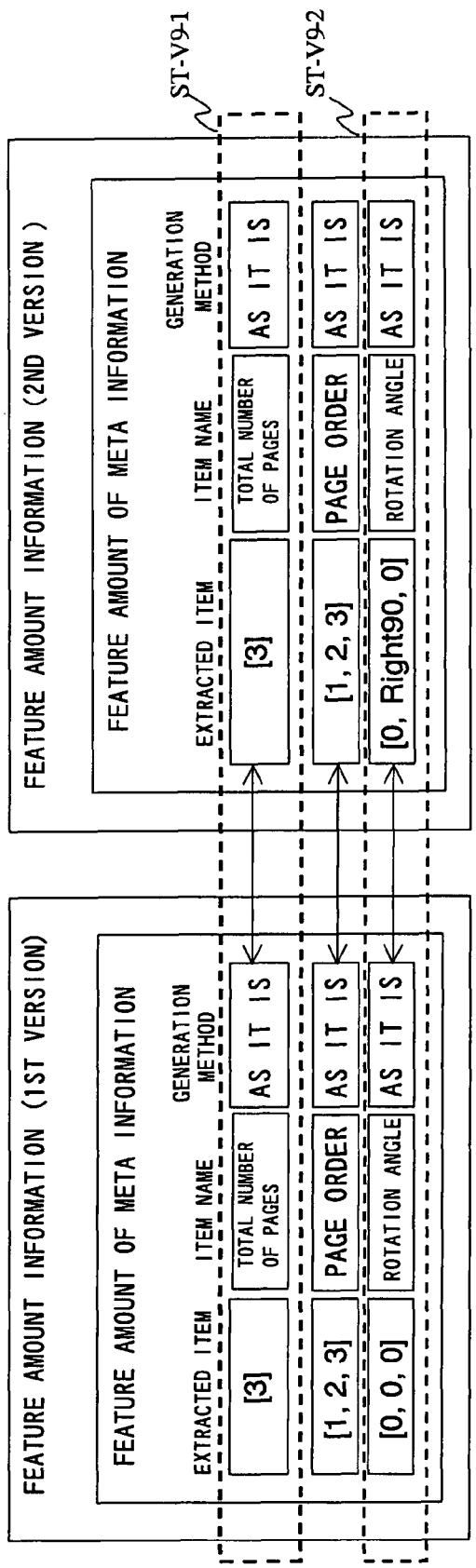
FIG. 18 is a view showing an example of comparison/verification using old and new meta information feature amounts.

FIG. 18 shows a state where respective items in the meta information are compared to each other. With regard to, for example, item name "total number of pages", extracted item "3 pages" is recorded in both the first and second versions without change and the sameness between them can be confirmed (step ST-V9-1). With regard also to item name "page order", the same comparison is made to achieve verification.

On the other hand, with regard to item name "rotation angle", different contents are recorded respectively in the first version and second version. That is, the rotation angles of all pages are 0° in the first version while that of the 2nd page is right 900 in the second version. Thus, it can be verified that the content of the item name "rotation angle" has been changed at the time when the digital document has been updated from 1st version to 2nd version (step ST-V9-2). This item of the meta information corresponds to the meta information concerning operations made to the 2nd version relative to the 1st version.

The above verification reveals that the contents of "total number of pages" and "page order" have not been changed from their 1st version and, with regard only to "rotation angle", only the 2nd page has been rotated clockwise by 90° from its 1st version.

Subsequently, the content information verification section 52 executes content information verification processing (step ST-V10). As in the case of the meta information verification processing, the content information verification processing is executed in the following procedures. Respective items in the content information are compared to each other using the feature amount information (2nd version) and feature amount information (1st version) which have been acquired in step ST-V4 to thereby determine how the change has been made is determined, and a changed part (unchanged part) is identified (determined).

Figure 19:
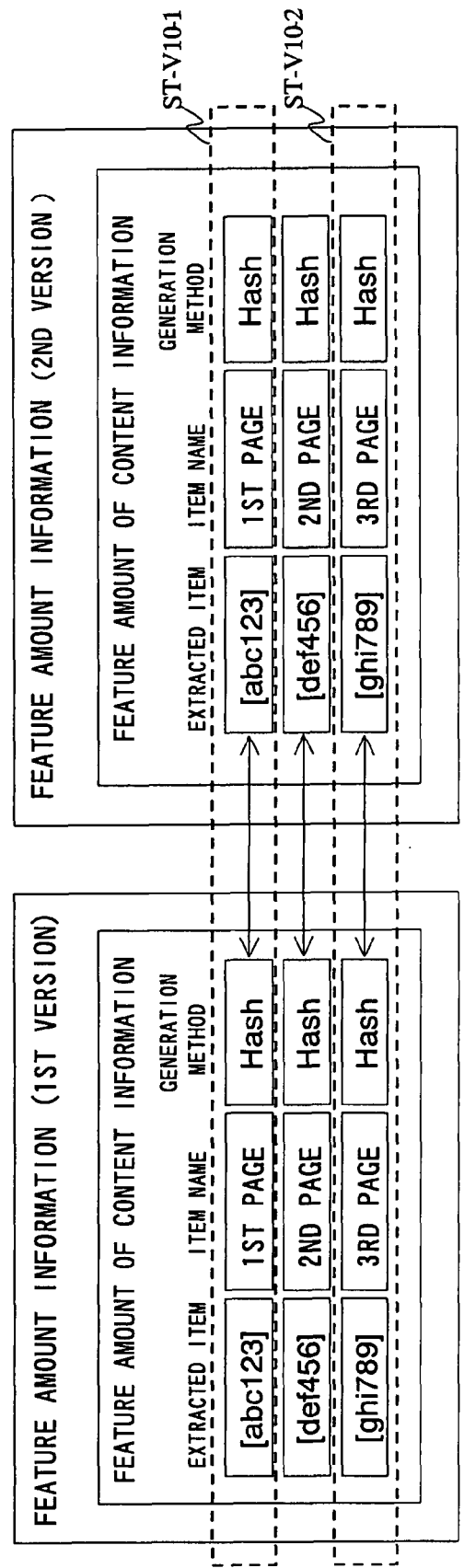
FIG. 19 is a view showing an example of comparison/verification using old and new content information feature amounts.

FIG. 19 shows a state where respective items in the content information are compared to each other. With regard to, for example, the 1st page, extracted item=abc123 (hash value) is recorded in both the first and second versions without change and the sameness between them can be confirmed (step ST-V10-1). With regard also to the 3rd page, extracted item=ghi789 (hash value) is recorded in both the first and second versions without change and the sameness between them can be confirmed (step ST-V10-2). With regard also to the 2nd page, the same comparison is made to achieve verification. The hash values of the 2nd page are not changed between the 1st and 2nd versions and the sameness between them can be confirmed. The above verification reveals that the content information of all pages are not changed from their 1st version.

The feature amount information verification section 50 merges/analyzes the verification results acquired from the meta information verification section 51 and content information verification section 52 and sends back the processed verification results to the processing controller 60. The processing controller 60 outputs the verification results to the operator in charge of verification 700C (step ST-V11).

Figure 20:
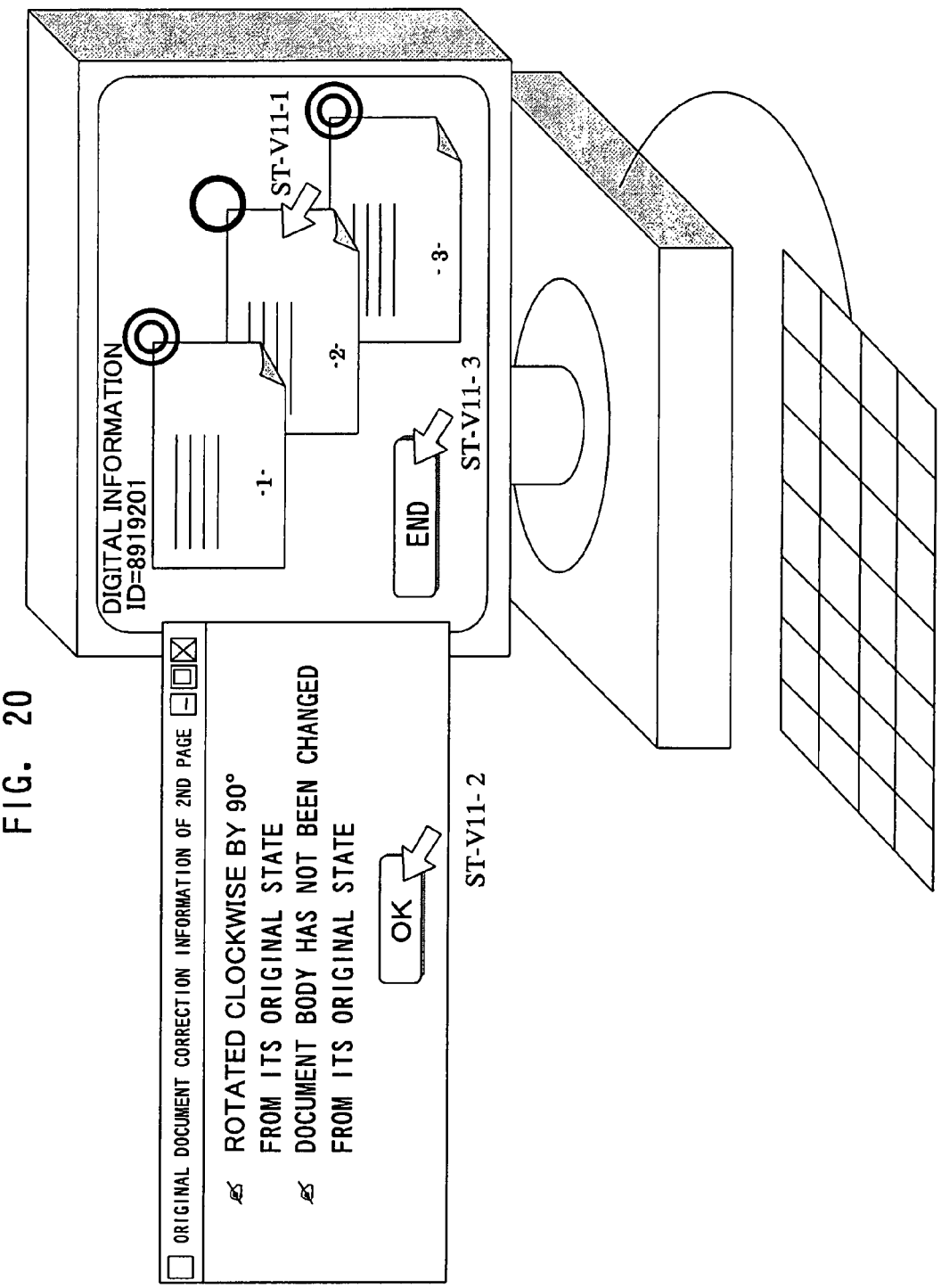
FIG. 20 is a view showing an example of verification result output screen.

FIG. 20 shows an example of a verification result output screen obtained by the above verification results. For example, an image of the pages constituting the document is displayed on the screen. Since the present embodiment assumes a document composed of only three pages, all pages can be displayed at a time. Each page is clickable for original document correction confirmation and, when being clicked, original document correction information of each page can be referred to.

Icons each representing an original document correction state are displayed on the upper right portions of the respective pages. For example, □ represents that no change has been made to the meta information and content information from their original state, ○ represents that only the meta information has been changed, □ represents that only the content information has been changed, and x represents that both the meta information and content information have been changed from their original state. The operator in charge of verification 700C checks such icons to thereby visually confirm the verification results.

The verification result that only the 2nd page has been rotated clockwise by 90° is obtained in the present embodiment, so that ○, which represents that only the meta information has been changed, is displayed on the upper right portion of the 2nd page.

When the operator in charge of verification 700C clicks the 2nd page on the screen (step ST-V11-1), an original document correction information window is popped up for confirmation of original document correction content (step ST-V11-2). The operator in charge of verification 700C depresses an end button on the screen to thereby end the verification processing (step ST-V11-3). When the above processing has been completed normally, the operator in charge of verification 700C logs out, and the verification processing is normally ended. If an error has occurred, the corresponding notification is made to the operator in charge of verification 700C, and the verification processing is aborted. These are the processing at the digital information verification time implemented by the verification function (C).

The verification processing in the present embodiment is achieved by using the 2nd version as the latest version and comparing the 2nd version with the 1st version (original document). However, it is not impossible to achieve the verification only in the case where the latest version is the 2nd version, but it is possible to achieve the verification, even if the version number is increased afterward, by selecting, on a case-by-case basis, a given version number. In this case, it is possible to track when, how, who has made a change to which page in which document of the original one, making it easy to manage/verify audit trail information. Further, not only the operator in charge of verification 700C, but also the digitized operator 700A and operator in charge of making change 700B can utilize the verification function for confirmation of the digital information after his or her operation.

Although, in the present embodiment, the feature amount information to be verified is acquired from the registration/management section 40 and the verification request is issued together with the feature amount information as input parameters to the feature amount information verification section 50, a configuration may be adopted in which the latest digital information is sent to the digital information analysis section 10 to thereby allow digital information analysis and feature amount information generation to be performed in real time. In this case, verification confirmation may be performed by acquiring only the 1st version (original document) of the feature amount information stored in the registration/management section 40 and sending the latest version of the feature amount information acquired from the digital information analysis section 10 to the feature amount information verification section 50.

[Second Embodiment]

A second embodiment of the present invention will next be described. In the present embodiment, a case where two binders are merged into one binder will be described. As in the case of the first embodiment, it is assumed that each binder is composed of three pages. FIG. 21 is a view for explaining the second embodiment.

There appear the following four characters in the present scene: a digitized operator 700A, an operator in charge of making change 700B, an operator in charge of verification 700C, and an operator in charge of merging 700D. The digitized operator 700A scans the binder (paper document) using a scanner and registers the obtained digitized document in the digital information verification apparatus 1. The operator in charge of making change 700B takes out the digitized document registered by the digitized operator 700A from the digital information verification apparatus 1, corrects a rotation error, and re-registers the corrected digitized document in the digital information verification apparatus 1.

The operator in charge of merging 700D takes out two digitized documents registered by the operator in charge of making change 700B from the digital information verification apparatus (digital information originality verification system) 1, merges the two digitized documents into one document, and re-registers it in the digital information verification apparatus 1. The operator in charge of verification 700C performs third-party certification of the digitized document registered in the digital information verification apparatus 1. The above four operators use the digital information verification apparatus 1 to perform the following processes.

(Process 1: Create)

The digitized operator 700A scans a binder (paper document) using a scanner to obtain a digitized document and inputs it as digital information to thereby complete registration of the digitized document in the digital information verification apparatus 1.

(Process 2: Change)

The operator 700A in charge of making change 700B detects a rotation error of a given page at the scan time and performs the rotation operation for the page and, after that, re-registers it in the digital information verification apparatus 1.

(Process 3: Merge)

The operator in charge of merging 700D merges two digitized document. More specifically, the operator in charge of merging 700D takes out digitized document A and digitized document B created through the above processes 1 and 2 from the digital information verification apparatus 1, merges them, and re-registers the merged document in the digital information verification apparatus 1.

(Process 4: Verify)

After completion of the above processes 1, 2, and 3 the operator in charge of verification 700C identifies the changed part and certifies unchanged part, followed by verification of the identification and certification.

In the following, operations in the respective processes will be described in detail. The operation procedure and operation content of the processes 1 and 2 are assumed to be the same as those in the first embodiment. Through the processes 1 and 2, the meta information, content information, and feature amount information generated from the feature amount information of the meta information and that of the content information have already been generated, respectively, with respect to two digitized documents A and B and, further, digital signatures and time stamps have been added to the feature amount information thereof, respectively.

Next, the process 3 will be described. The operator in charge of merging 700D acquires the digitized document A and digitized document B registered in the digital information verification apparatus 1 and merges the two digitized document. For example, the operator in charge of merging 700D calls up the previously registered digitized document A (composed of 3 pages) with digital information ID (=8919201) and previously registered digitized document B (composed of 3 pages) with digital information ID (=8968453), merges the two digital documents to obtain a new digitized document C (composed of 6 pages), and registers it in the digital information verification apparatus 1. Thus, a new digital information ID (=9054686) is obtained.

At this time, as the content information of the digitized document C obtained by one merging method, there is obtained content information in which the content information of the digitized document B follows after the content information of the digitized document A (DOC-C-1 in FIG. 21). Further, as the content information of the digitized document C obtained by another merging method, there is obtained content information in which the content information of the digitized document B corresponding to 3 pages are inserted between the content information of the 2nd and 3rd pages of the digitized document A (DOC-C-2 in FIG. 21). Thus, even if the order of the pages is changed in the merged digital information, specification and verification thereof can obviously be achieved.

The meta information of the digitized document C is generated from the meta information of the digitized document A, meta information of the digitized document B, and content information of the digitized document C. The digital information verification apparatus 1 generates the feature amount information of the digitized document C and adds a digital signature and time stamp thereto.

In the process 4, the operator in charge of verification 700C identifies the changed part and certifies unchanged part, followed by verification of the identification and certification, as in the case of the process 3 in the first embodiment.

Although two binders are merged into one binder in the present embodiment, the present embodiment is also applicable to a case where three or more binders are merged into one binder in the same way. Further, the present embodiment can deal not only with the merging of the binders, but also with various operations as shown in FIG. 22, such as change of file format (FIG. 22A), page order change (FIG. 22B), page insertion (FIG. 22C), JPEG alteration to page (FIG. 22D), page deletion (FIG. 22E), page rotation (FIG. 22F), addition of comment/notation (FIG. 22G), or addition of note/supporting data (FIG. 22H).

Although a binder (paper document) is captured by a scanner for handling a digitized document in the present embodiment, the present embodiment is not limited to a system corresponding to the above case. For example, it is possible to deal with a document created by a personal computer or the like as digital information in the present embodiment.

As has been described above in detail, the following steps are performed in the embodiments of the present invention to determine presence/absence of any change to the digital document and identify the changed part: generating the feature amount information with respect to digital information to be verified and registering it in association with the digital document; in the case where any operation is made to the digital information, acquiring the feature amount information (meta information related parameters and content information related parameters) of the meta information and content information concerning the operation, the feature amount information including the same items (meta information and content information) as those of the feature amount information related to the digital information before being changed; and comparing the feature amount information before and after the operation.

According to the embodiments of the present invention, certification/verification of authenticity and integrity of a digital document including the meta information such as a header, property, and the like can be achieved while considering the meta information in order to respond flexibly to operations such as page rotation, notation addition, merging of documents, and the like even after scan operation (addition of digital signature/time stamp), and third-party certification of the digital document can be achieved.

It is possible to provide a program that allows a computer to execute the above operations shown in the flowcharts and steps illustrated in the present embodiments as a digital document management program of the present invention. By storing the above program in a computer-readable storage medium, it is possible to allow the computer to execute the program. The computer-readable medium mentioned here includes: a portable storage medium such as a CD-ROM, a flexible disk, a DVD disk, a magneto-optical disk, or an IC card; a database that holds computer program; and another computer and database thereof.

What is claimed is:

1. A non-transitory recording medium that records a computer-readable digital information verification program in order to cause a computer to execute a method of verifying digital information, the digital information verification program causing a computer to execute a process comprising:

generating feature amount information for identifying the digital information, the feature amount information including first information generated from meta information of the digital information and second information generated from content information of the digital information, the first information including a plurality of first items for operations of the digital information and the second information including a plurality of second items for the content information;

registering the feature amount information generated by the generating and digital information in association with each other; and using the generating to generate feature amount information of second digital information corresponding to first digital information which is the digital information registered by the registering, the second digital information being obtained by changing the first digital information, specifying the changed part of the second digital information based on the first digital information and specifying how the change has been made based on the first digital information by comparing the first item in the feature amount information of the first digital information with the first item in the feature amount information of the second digital information and by comparing the second item in the feature amount information of the first digital information with the second item in the feature amount information of the second digital information.

2. The non-transitory recording medium according to claim 1, wherein
the process further comprises performing analysis processing for the digital information and extracting the meta information and content information to be used in the generating in a separated manner.

3. The non-transitory recording medium according to claim 1, wherein
the generating selects at least a part of information respectively from the acquired meta information and content information, selects one feature amount information generation method from a plurality of previously set feature amount information generation methods with respect, respectively, to the selected meta information and content information, and executes the selected feature amount information generation method to generate the feature amount information.

4. The non-transitory recording medium according to claim 1, wherein
the generating uses a one-way hash function to calculate a hash value for at least one of the meta information and content information to thereby generate the feature amount information.

5. The non-transitory recording medium according to claim 4, wherein
when using the one-way hash function to calculate a hash value, the generating adds random numbers to information to be calculated to thereby calculate the hash value.

6. The non-transitory recording medium according to claim 4, wherein
when using the one-way hash function to calculate a hash value, the generating adds date and time information to information to be calculated to thereby calculate the hash value.

7. The non-transitory recording medium according to claim 1, wherein
the generating encodes the content of at least one of the meta information and content information to thereby generate the feature amount information.

8. The non-transitory recording medium according to claim 1, wherein
the generating adds, to the generated feature amount information, predetermined information indicating a basis upon which the feature amount information has been generated.

9. The non-transitory recording medium according to claim 8, wherein
the predetermined information includes at least one of information concerning which parts of the meta information and the content information in the digital information have been used to generate the feature amount information, information concerning a feature amount generation method indicating how the feature amount information has been generated from the meta information and content information, and information indicating the random numbers or date and time used when the feature amount information is generated.

10. The non-transitory recording medium according to claim 1, wherein
the generating extracts the statistics amount of the content of the content information and uses the statistics amount to thereby generate feature amount information of the content information.

11. The non-transitory recording medium according to claim 1, wherein
in the case where the document information is composed of a plurality of documents or plurality of pages, the generating generates the feature amount information of the content information in units of a document or a page, or, with respect to a given part in each document or page.

12. The non-transitory recording medium according to claim 1, wherein
the generating generates the feature amount information of the meta information and the content information, respectively and integrates the respective feature amount information into one feature amount information.

13. The non-transitory recording medium according to claim 1, wherein
the registering adds digital signatures respectively to the entire digital information and entire feature amount information at the registration time.

14. The non-transitory recording medium according to claim 1, wherein
the feature amount information generated, with respect to the second digital information, by the generating is the feature amount information including the same meta information and content information as those of the feature amount information related to the digital information registered by the registering.

15. The non-transitory recording medium according to claim 1, wherein
the registering adds time stamps respectively to the entire digital information and entire feature amount information at the registration time.

16. The non-transitory recording medium according to claim 1, wherein
- the digital information is document information read out by a scanner,
- the generating generates, in units a page, the feature amount information from the document information read out by the scanner, and
- the identifying compares, in units of a page, the feature amount information corresponding respectively to the first digital information registered by the registering and the second digital information to determine, in units of a page, presence/absence of any change.

17. The non-transitory recording medium according to claim 16, wherein
- the generating selects the rotation angle of each page of the document read out by the scanner as the meta information and generates the feature amount information thereof.

18. A digital information verification apparatus that verifies digital information, the apparatus comprising:
- feature amount information generation means for generating feature amount information for identifying the digital information, the feature amount information including first information generated from meta information of the digital information and second information generated from content information of the digital information, the first information including a plurality of first items for operations of the digital information and the second information including a plurality of second items for the content information;
- registration means for registering the feature amount information generated by the generating and digital information in association with each other; and
- feature amount information verification means for using the feature amount information generation means to generate feature amount information of second digital information corresponding to first digital information which is the digital information registered by the registration means, the second digital information being obtained by changing the first digital information, specifying the changed part of the second digital information based on the first digital information and specifying how the change has been made based on the first digital information by comparing the first item in the feature amount information of the first digital information with the first item in the feature amount information of the second digital information and by comparing the second item in the feature amount information of the first digital information with the second item in the feature amount information of the second digital information.

19. The digital information verification apparatus according to claim 18, further comprising:
- digital information analysis means for performing analysis processing for the digital information and extracts the meta information and content information to be used in the feature amount information generation means in a separated manner.

20. A digital information verification method causing a computer to execute verification of digital information, the method comprising:
- generating feature amount information for identifying the digital information, the feature amount information including first information generated from meta information of the digital information and second information generated from content information of the digital information, the first information including a plurality of first items for operations of the digital information and the second information including a plurality of second items for the content information;
- registering the feature amount information generated by the generating and digital information in association with each other; and
- using the generating to generate feature amount information of second digital information corresponding to first digital information which is the digital information registered by the registering, the second digital information being obtained by changing the first digital information, specifying the changed part of the second digital information based on the first digital information and specifying how the change has been made based on the first digital information by comparing the first item in the feature amount information of the first digital information with the first item in the feature amount information of the second digital information and by comparing the second item in the feature amount information of the first digital information with the second item in the feature amount information of the second digital information.

* * * * *